United States Patent
Li et al.

(10) Patent No.: US 12,542,731 B2
(45) Date of Patent: Feb. 3, 2026

(54) METHOD FOR ADVERTISING TOPOLOGY INFORMATION, METHOD FOR COLLECTING NETWORK TOPOLOGY, AND DEVICE

(71) Applicant: Huawei Technologies Co., Ltd., Shenzhen (CN)

(72) Inventors: Wenyan Li, Beijing (CN); Haibo Wang, Beijing (CN); Lili Wang, Beijing (CN); Lei Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 363 days.

(21) Appl. No.: 18/309,310

(22) Filed: Apr. 28, 2023

(65) Prior Publication Data
US 2023/0269169 A1  Aug. 24, 2023

Related U.S. Application Data

(63) Continuation of application No. PCT/CN2021/128224, filed on Nov. 2, 2021.

(30) Foreign Application Priority Data

Nov. 4, 2020 (CN) .......................... 202011217967.7

(51) Int. Cl.
*H04L 45/02* (2022.01)
(52) U.S. Cl.
CPC .................................. *H04L 45/04* (2013.01)
(58) Field of Classification Search
CPC ......... H04L 45/04; H04L 45/42; H04L 45/02; H04L 45/32; H04L 45/52; H04L 41/12
See application file for complete search history.

(56) References Cited

U.S. PATENT DOCUMENTS

| | | | | |
|---|---|---|---|---|
| 2006/0233181 | A1* | 10/2006 | Raszuk | H04L 45/54 370/401 |
| 2010/0220736 | A1* | 9/2010 | Mohapatra | H04L 45/28 370/401 |
| 2016/0294673 | A1* | 10/2016 | Ashida | H04L 45/036 |
| 2017/0317971 | A1* | 11/2017 | Dubey | H04L 45/42 |
| 2018/0091518 | A1* | 3/2018 | Zhuang | H04L 45/03 |

FOREIGN PATENT DOCUMENTS

| CN | 102594714 A | * | 7/2012 |
|---|---|---|---|
| CN | 104168154 A | | 11/2014 |

OTHER PUBLICATIONS

H. Gredler, Ed. et al., North-Bound Distribution of Link-State and Traffic Engineering (TE) Information Using BGP, Internet Engineering Task Force (IETF) Request for Comments: 7752, Mar. 2016, total 48 pages.
S. Previdi et al, BGP-LS extensions for Segment Routing BGP Egress Peer Engineering draft-ietf-idr-bgpls-segment-routing-epe-19, May 16, 2019, total 15 pages.

* cited by examiner

*Primary Examiner* — Mohamed A Kamara
(74) *Attorney, Agent, or Firm* — Conley Rose, P.C.

(57) ABSTRACT

A method for advertising topology information and collecting a network topology comprises, when a topology is sent, both an intra-domain topology and an inter-domain topology carry a node identifier, and carry a same node identifier, such that a controller device automatically associates intra-domain topology information with the inter-domain topology based on the same node identifier.

20 Claims, 8 Drawing Sheets

METHOD FOR ADVERTISING TOPOLOGY INFORMATION, METHOD FOR COLLECTING NETWORK TOPOLOGY, AND DEVICE

CROSS-REFERENCE TO RELATED APPLICATIONS

This application is a continuation application of International Patent Application No. PCT/CN2021/128224, filed on Nov. 2, 2021, which claims priority to Chinese Patent Application No. 202011217967.7, filed on Nov. 4, 2020. The disclosures of the aforementioned applications are hereby incorporated by reference in their entireties.

TECHNICAL FIELD

This application relates to the field of network technologies, and in particular, to a method for advertising topology information, a method for collecting a network topology, and a device.

BACKGROUND

When collecting a topology, a controller device needs to obtain end-to-end topology or path information based on network information. In related technologies, a large quantity of complex configuration operations needs to be manually performed on the controller device, and the controller device obtains the end-to-end topology information according to the configuration operations. Consequently, the configuration is complex.

SUMMARY

Embodiments of this application provide a method for advertising topology information, a method for collecting a network topology, and a device, so as to improve efficiency of topology collection by a controller device. The technical solutions are as follows.

According to a first aspect, a method for advertising topology information is provided. In this method, a first network device obtains a node identifier; and the first network device advertises intra-domain topology information and inter-domain topology information to a controller device based on the node identifier. Both the intra-domain topology information and the inter-domain topology information include the node identifier. The intra-domain topology information indicates a topology in a first domain. The inter-domain topology information indicates a topology between the first domain and a second domain. The first domain is a domain to which the first network device belongs.

In the method provided above, when a network device sends a topology, both an intra-domain topology and an inter-domain topology carry a node identifier, and carry a same node identifier, so that a controller device automatically associates intra-domain topology information with the inter-domain topology based on the same node identifier, reducing complexity of network configuration, thereby improving efficiency of topology collection by the controller device.

In a possible implementation, that the first network device advertises intra-domain topology information and inter-domain topology information to a controller device based on the node identifier includes the following: The first network device sends a first Border Gateway Protocol (BGP) link-state (BGP-LS) packet to the controller device. The first BGP-LS packet includes at least one of the intra-domain topology information or the inter-domain topology information.

In the implementation provided above, such BGP-LS packet is extended, and the topology including the node identifier is sent based on the BGP-LS. When a topology is collected based on the BGP-LS, topology sending and topology collection can be implemented by using a same protocol, thereby reducing types of protocols that need to be supported by a device and reducing implementation complexity.

In a possible implementation, the first BGP-LS packet includes a BGP-LS node route, and the BGP-LS node route includes the node identifier; the first BGP-LS packet includes a BGP-LS route of a target route type, the BGP-LS route of the target route type includes global device information, and the global device information includes the node identifier; the first BGP-LS packet includes a BGP-LS link route, and the BGP-LS link route includes the node identifier; or the first BGP-LS packet includes a Segment Routing (SR) over Internet Protocol version 6 (SRv6) segment identifier (SID) route, and the SRv6 SID route includes the node identifier.

In the implementation provided above, the BGP-LS node route, the BGP-LS link route, or the SRv6 SID route is used to carry the node identifier, or the BGP-LS route used to send global device information is newly added to carry the node identifier, so that more application scenarios can be satisfied.

In a possible implementation, a route attribute field in the first BGP-LS packet includes a node identifier type-length-value (TLV), a value of the node identifier TLV includes the node identifier, and a type of the node identifier TLV identifies that the node identifier TLV carries the node identifier.

In the implementation provided above, the TLV is newly added to carry the node identifier, so that the controller device can directly obtain the node identifier from the newly added TLV, thereby reducing network configuration.

In a possible implementation, the route attribute field is a node attribute field or a link attribute field.

In a possible implementation, the node identifier identifies the first network device; or the node identifier identifies a second network device, the second network device belongs to the first domain, and the second network device is a border routing device of the first domain and the second domain.

In a possible implementation, when the node identifier identifies the second network device, before that the first network device advertises intra-domain topology information and inter-domain topology information to a controller device based on the node identifier, the method further includes the following: The first network device receives the node identifier sent by the second network device.

In a possible implementation, that the first network device receives the node identifier sent by the second network device includes the following: The first network device receives an Interior Gateway Protocol (IGP) packet sent by the second network device, where the IGP packet includes the node identifier; or the first network device receives a second BGP-LS packet sent by the second network device, where the second BGP-LS packet includes the node identifier.

In a possible implementation, before that the first network device advertises intra-domain topology information and inter-domain topology information to a controller device based on the node identifier, the method further includes the following: The first network device receives a third BGP-LS packet sent by the second network device. The third BGP-LS packet includes the inter-domain topology information.

In a possible implementation, the node identifier includes one or more of the following such as a BGP node identifier, an IGP node identifier, a traffic engineering (TE) node identifier, a system-ID, an Internet Protocol version 4 (IPv4) local node identifier, and an IP version 6 (IPv6) local node identifier.

According to a second aspect, a method for collecting a network topology is provided. In this method, a controller device receives intra-domain topology information and inter-domain topology information, where both the intra-domain topology information and the inter-domain topology information include a node identifier, the node identifier identifies a network device, the intra-domain topology information indicates a topology in a first domain, the inter-domain topology information indicates a topology between the first domain and a second domain, and the first domain is a domain to which the network device belongs; and the controller device establishes an association relationship between the intra-domain topology information and the inter-domain topology information based on the node identifier.

In the method provided above, when collecting a topology, the controller device associates intra-domain topology information with an inter-domain topology based on a same node identifier, avoiding a heavy workload caused by manual configuration of consistent node identifiers, thereby reducing complexity of network configuration. Therefore, efficiency of topology collection by the controller device is improved, and the controller device can compute an end-to-end forwarding path based on an associated topology.

In a possible implementation, the node identifier identifies a first network device, and that a controller device receives intra-domain topology information and inter-domain topology information includes the following: The controller device receives the intra-domain topology information and the inter-domain topology information that are sent by the first network device; the controller device receives the intra-domain topology information and the inter-domain topology information that are sent by a second network device, where both the second network device and the first network device belong to the first domain; the controller device receives the intra-domain topology information sent by the first network device, and the controller device receives the inter-domain topology information sent by the second network device; or the controller device receives the inter-domain topology information sent by the first network device, and the controller device receives the intra-domain topology information sent by the second network device.

According to a third aspect, a method for advertising a node identifier is provided. In this method, a second network device advertises a node identifier to a first network device. The node identifier identifies the second network device. The node identifier is used to associate intra-domain topology information with inter-domain topology information. The intra-domain topology information indicates a topology in a first domain. The inter-domain topology information indicates a topology between the first domain and a second domain. The first domain is a domain to which the second network device and the first network device belong. The second network device is a border routing device of the first domain and the second domain.

In the method provided above, the border routing device advertises the node identifier of the border routing device to the network device in the same domain, so that the network device includes the node identifier of the border routing device in both the intra-domain topology and the inter-domain topology, and sends the node identifier to the controller device. Therefore, the controller device can automatically associate the intra-domain topology information with the inter-domain topology based on the same node identifier, avoiding a huge workload caused by manual configuration of consistent node identifiers and reducing complexity of network configuration, thereby improving efficiency of topology collection by the controller device.

In a possible implementation, that a second network device advertises a node identifier to a first network device includes the following: The second network device floods an IGP packet in the first domain, where the IGP packet includes the node identifier; or the second network device sends a BGP-LS packet to the first network device, where the BGP-LS packet includes the node identifier.

In a possible implementation, the node identifier includes one or more of the following: a BGP node identifier, an IGP node identifier, a TE node identifier, a system-ID, an IPv4 local node identifier, and an IPv6 local node identifier.

According to a fourth aspect, a network device is provided. The network device has a function of implementing the first aspect or any one of the optional implementations of the first aspect. The network device includes at least one unit. The at least one unit is configured to implement the method according to the first aspect or any one of the optional implementations of the first aspect.

In some embodiments, the units in the network device provided in the fourth aspect are implemented by software, and the units in the network device are program modules. In some other embodiments, the units in the network device provided in the fourth aspect are implemented by hardware or firmware. For details of the network device provided in the fourth aspect, refer to the first aspect or any one of the optional implementations of the first aspect. Details are not described herein again.

According to a fifth aspect, a controller device is provided. The controller device has a function of implementing the second aspect or any one of the optional implementations of the second aspect. The controller device includes at least one unit. The at least one unit is configured to implement the method according to the second aspect or any one of the optional implementations of the second aspect.

In some embodiments, the units in the controller device provided in the fifth aspect are implemented by software, and the units in the controller device are program modules. In some other embodiments, the units in the controller device provided in the fifth aspect are implemented by hardware or firmware. For details of the controller device provided in the fifth aspect, refer to the second aspect or any one of the optional implementations of the second aspect. Details are not described herein again.

According to a sixth aspect, a network device is provided. The network device has a function of implementing the third aspect or any one of the optional implementations of the third aspect. The network device includes at least one unit. The at least one unit is configured to implement the method according to the third aspect or any one of the optional implementations of the third aspect.

In some embodiments, the units in the network device provided in the sixth aspect are implemented by software, and the units in the network device are program modules. In some other embodiments, the units in the network device provided in the sixth aspect are implemented by hardware or firmware. For details of the network device provided in the sixth aspect, refer to the third aspect or any one of the optional implementations of the third aspect. Details are not described herein again.

According to a seventh aspect, a network device is provided. The network device includes a processor and a communication interface. The processor is configured to execute instructions, so that the network device can perform the method provided in the first aspect or any one of the optional implementations of the first aspect. The communication interface is configured to receive or send a packet. For details of the network device provided in the seventh aspect, refer to the first aspect or any one of the optional implementations of the first aspect. Details are not described herein again.

According to an eighth aspect, a controller device is provided. The controller device includes a processor and a communication interface. The processor is configured to execute instructions, so that the controller device can perform the method provided in the second aspect or any one of the optional implementations of the second aspect. The communication interface is configured to receive or send a packet. For details of the controller device provided in the eighth aspect, refer to the second aspect or any one of the optional implementations of the second aspect. Details are not described herein again.

According to a ninth aspect, a network device is provided. The network device includes a processor and a communication interface. The processor is configured to execute instructions, so that the network device can perform the method provided in the third aspect or any one of the optional implementations of the third aspect. The communication interface is configured to receive or send a packet. For details of the network device provided in the ninth aspect, refer to the third aspect or any one of the optional implementations of the third aspect. Details are not described herein again.

According to a tenth aspect, a network device is provided. The network device includes a main control board and an interface board. Further, the network device may further include a switch fabric. The network device is configured to perform the method in the first aspect or any possible implementation of the first aspect. In an example, the network device includes a unit configured to perform the method in the first aspect or any possible implementation of the first aspect.

According to an eleventh aspect, a controller device is provided. The controller device includes a main control board and an interface board. Further, the controller device may further include a switch fabric. The controller device is configured to perform the method in the second aspect or any possible implementation of the second aspect. In an example, the controller device includes a unit configured to perform the method in the second aspect or any possible implementation of the second aspect.

According to a twelfth aspect, a network device is provided. The network device includes a main control board and an interface board. Further, the network device may further include a switch fabric. The network device is configured to perform the method in the third aspect or any possible implementation of the third aspect. In an example, the network device includes a unit configured to perform the method in the third aspect or any possible implementation of the third aspect.

According to a thirteenth aspect, a computer-readable storage medium is provided. The storage medium stores at least one instruction. The at least one instruction is read by a processor, so that a network device can perform the method provided in the first aspect or any one of the optional implementations of the first aspect.

According to a fourteenth aspect, a computer-readable storage medium is provided. The storage medium stores at least one instruction. The at least one instruction is read by a processor, so that a controller device can perform the method provided in the second aspect or any one of the optional implementations of the second aspect.

According to a fifteenth aspect, a computer-readable storage medium is provided. The storage medium stores at least one instruction. The at least one instruction is read by a processor, so that a network device can perform the method provided in the third aspect or any one of the optional implementations of the third aspect.

According to a sixteenth aspect, a computer program product is provided. The computer program product includes computer instructions. The computer instructions are stored in a computer-readable storage medium. A processor of a network device reads the computer instructions from the computer-readable storage medium, and the processor executes the computer instructions, so that the network device can perform the method provided in the first aspect or any one of the optional implementations of the first aspect.

According to a seventeenth aspect, a computer program product is provided. The computer program product includes computer instructions. The computer instructions are stored in a computer-readable storage medium. A processor of a controller device reads the computer instructions from the computer-readable storage medium, and the processor executes the computer instructions, so that the controller device can perform the method provided in the second aspect or any one of the optional implementations of the second aspect.

According to an eighteenth aspect, a computer program product is provided. The computer program product includes computer instructions. The computer instructions are stored in a computer-readable storage medium. A processor of a network device reads the computer instructions from the computer-readable storage medium, and the processor executes the computer instructions, so that the network device can perform the method provided in the third aspect or any one of the optional implementations of the third aspect.

According to a nineteenth aspect, a chip is provided. When the chip is run on a network device, the network device can perform the method provided in the first aspect or any one of the optional implementations of the first aspect.

According to a twentieth aspect, a chip is provided. When the chip is run on a controller device, the controller device can perform the method provided in the second aspect or any one of the optional implementations of the second aspect.

According to a twenty-first aspect, a chip is provided. When the chip is run on a network device, the network device can perform the method provided in the third aspect or any one of the optional implementations of the third aspect.

According to a twenty-second aspect, a network system is provided. The network system includes the network device according to the fourth aspect, the seventh aspect, or the tenth aspect. The network system further includes the controller device according to the fifth aspect, the eighth aspect, or the eleventh aspect. The network system further includes the network device according to the sixth aspect, the ninth aspect, or the twelfth aspect.

DESCRIPTION OF EMBODIMENTS

Figure 1:
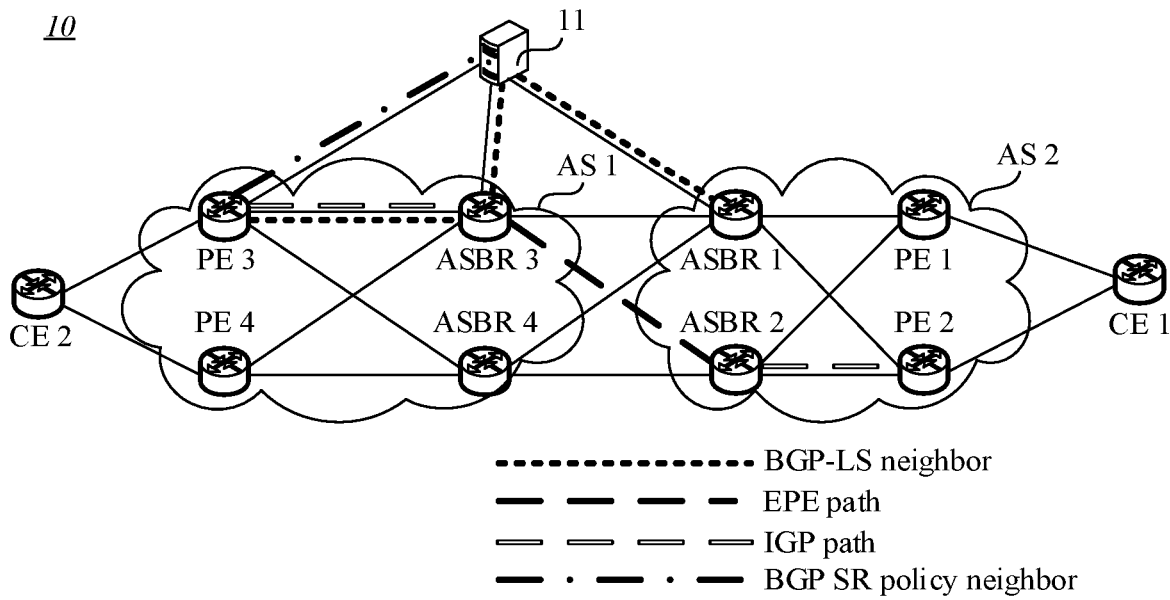
FIG. 1 is a schematic diagram of an architecture of a network system 10 according to an embodiment of this application.

To make objectives, technical solutions, and advantages of this application clearer, the following further describes implementations of this application in detail with reference to the accompanying drawings.

In this application, terms such as "first" and "second" are used to distinguish between same items or similar items that have basically same effects and functions. It should be understood that there is no logical or time-sequence dependency among "first", "second", and "third", and a quantity and an execution sequence are not limited. It should also be understood that although the terms such as "first" and "second" are used in the following descriptions to describe various elements, these elements should not be limited by the terms. These terms are merely used to distinguish one element from another element. For example, without departing from the scope of various examples, a first BGP-LS packet may be referred to as a second BGP-LS packet, and similarly, a second BGP-LS packet may be referred to as a first BGP-LS packet. Both the first BGP-LS packet and the second BGP-LS packet may be BGP-LS packets, and in some cases, may be separate and different BGP-LS packets.

The following first describes some terms and features in embodiments of this application.

(1) Node Identifier (ID)

The node identifier identifies a network device in a domain. The node identifier includes a plurality of types. In an example, the node identifier includes one or more of the following: a BGP node identifier or BGP router identifier (BGP router-ID), an IGP node identifier or IGP router identifier (IGP router-ID), a TE node identifier or TE router-ID (TE router-ID), a system identifier (system-ID), an IPv4 local node identifier (IPv4 router-ID of local node), and an IPv6 local node identifier (IPv6 router-ID of local node).

(2) BGP Node Identifier (BGP Router-ID)

The BGP router-ID is used as a unique identifier for interaction between a border gateway protocol (border gateway protocol, BGP) process on a router and a BGP process on another router. The BGP router-ID is unique in an autonomous system (AS). In an example, the BGP router-ID is represented in a form of an IPv4 address. For example, the BGP router-ID is an IP address of a loopback interface or an IP address of a physical interface in a network device.

(3) System-ID (System-ID)

The system-ID uniquely identifies a device (such as a host or router) in a region. A length of the system-ID is, for example, 48 bits (6 bytes).

(4) TE Node Identifier (TE Router-ID)

The TE node identifier is a node ID. The TE router-ID is in a form of an IP address. For the definition of the TE router-ID, see section 4.3 of Request for Comments 5305 (request for comments, RFC 5305, a series of numbered documents).

(5) IGP

The IGP is a routing protocol running in an AS. For example, the IGP protocol is Open Shortest Path First (OSPF) or Intermediate System to Intermediate System (IS-IS).

(6) BGP

The BGP is a dynamic routing protocol used among ASs. The BGP is mainly used to exchange reachability routing information among the ASs, establish inter-AS transmission paths, prevent routing loops, and apply some routing policies at an AS level.

(7) Topology (Topo) Information

The topology information refers to information including a network topology. The topology information includes but is not limited to node information and link information. The node information is information about a device (node) included in a network. The link information is information about a link between devices in the network. In an example, the node information in the topology information includes at least one piece of local node description information (local node descriptor) and at least one piece of remote node description information (remote node descriptor). In an example, the topology information includes a protocol identifier (protocol-ID). The protocol ID indicates a communication protocol based on which the topology information is collected. In an example, the topology information includes an AS number, and the AS number identifies an AS corresponding to the topology information. The topology information in the embodiments is classified into intra-domain topology information and inter-domain topology information.

(8) Intra-Domain Topology Information

The intra-domain topology information indicates a topology relationship in a domain (for example, an IGP domain). The intra-domain topology information can be collected based on an IS-IS protocol, an OSPF protocol, or another IGP protocol. A protocol ID in the intra-domain topology information is, for example, an ID of the IS-IS protocol, an ID of the OSPF protocol, or an ID of another IGP protocol. In an example, in the intra-domain topology information, an AS number in local node description information is the same as an AS number in remote node description information. For details about how to collect and report the intra-domain topology information, refer to RFC 7752.

(9) Inter-Domain Topology Information

The inter-domain topology information indicates a topology relationship between different domains. The inter-domain topology information can be collected through a BGP protocol. A protocol ID in the inter-domain topology information is, for example, an ID of the BGP protocol. In an example, in the inter-domain topology information, an AS number in local node description information is different from an AS number in remote node description information. For details about how to collect and report the inter-domain topology information, refer to draft-ietf-idr-bgpls-segment-routing-epe at the internet Engineer Task Force (IETF).

(10) Relationship Between Intra-Domain Topology Information and Inter-Domain Topology Information The intra-domain topology information includes at least one node identifier. The inter-domain topology information includes at least one node identifier. In addition, the intra-domain topology information and the inter-domain topology information include at least one same node identifier. As the intra-domain topology information and the inter-domain topology information include a same node identifier, a controller device can automatically associate the intra-domain topology information with the inter-domain topology information based on the node identifier, so as to splice an intra-domain topology and an inter-domain topology. With reference to various types of node identifiers described above, a relationship between the intra-domain topology information and the inter-domain topology information is involved in a plurality of scenarios. The following is described by using an example in which a network device A exists in a network.

In an example, a BGP router-ID of the network device A is used as a node identifier of the network device A for the intra-domain topology information, and the BGP router-ID of the network device A is also used as a node identifier of the network device A for the inter-domain topology information. As the intra-domain topology information and the inter-domain topology information include the same BGP router-ID, a controller can automatically associate the intra-domain topology information with the inter-domain topology information based on the BGP router-ID.

In another example, an IGP router-ID of the network device A is used as a node identifier of the network device A for the intra-domain topology information, and the IGP router-ID of the network device A is also used as a node identifier of the network device A for the inter-domain topology information. As the intra-domain topology information and the inter-domain topology information include the same IGP router-ID, a controller can automatically associate the intra-domain topology information with the inter-domain topology information based on the IGP router-ID.

In another example, a system-ID of the network device A is used as a node identifier of the network device A for the intra-domain topology information, and the system-ID of the network device A is also used as a node identifier of the network device A for the inter-domain topology information. As the intra-domain topology information and the inter-domain topology information include the same system-ID, a controller can automatically associate the intra-domain topology information with the inter-domain topology information based on the system-ID.

(11) BGP-LS

The BGP-LS is a manner of collecting a network topology. The BGP-LS is used to summarize topology information collected based on an IGP protocol and send the topology information to an upper-layer controller, to make topology collection easier and more efficient.

(12) BGP Route

The BGP route includes a route prefix and a route attribute. Each BGP route includes one route attribute. A route attribute includes one or more sub-attributes.

(13) BGP Route Attribute

The BGP route attribute is a group of parameters carried in BGP routing information. The BGP route attribute further describes the route and expresses various features of each route, so that a receiving end can filter and select routes based on a value of the route attribute. The route attribute is an important feature that distinguishes a BGP protocol from other protocols. Route selection, loop avoidance, and the like are implemented based on the BGP by comparing attributes carried in routes.

(14) BGP Optional Non-Transitive Route Attribute

The optional non-transitive route attribute is a type of BGP route attributes. If a BGP router does not support this attribute, the BGP router omits this attribute and does not advertise this attribute to other peers.

(15) BGP-LS Route

The BGP-LS route is a medium carrying network topology information. The BGP-LS route includes six types, respectively carrying nodes, links, route prefix information, IPv6 route prefix information, SRv6 SID route information, and TE policy (TE policy) route information. These routes work together to transmit topology information.

(16) BGP-LS Node Route

The BGP-LS node route is used to record node information of a topology.

(17) BGP-LS Network Layer Reachability Information (NLRI)

Based on the BGP, the BGP-LS introduces a series of new NLRI to carry links, nodes, and IPv4/IPv6 prefix-related information. The new NLRI is referred to as link-state NLRI (link-state NLRI). The link-state NLRI is usually carried in an attribute (attribute) of a BGP-LS update (BGP-LS update) packet.

The BGP-LS mainly defines the following link-state NLRI: node NLRI, link NLRI, IPv4 topology prefix NLRI, and IPv6 topology prefix NLRI. In addition, the BGP-LS further defines corresponding attributes for the foregoing NLRI, to carry links, nodes, and IPv4/IPv6 prefix-related parameters and attributes. A BGP-LS attribute is carried with corresponding NLRI in a BGP-LS message in a form of a TLV. All these attributes, mainly including a node attribute, a link attribute, and a prefix attribute, belong to a BGP optional non-transitive attribute.

(18) Node NLRI

The node NLRI is a local node descriptor, including a series of node descriptors (with a structure of a sub-TLV).

(19) BGP-LS Attribute

The BGP-LS attribute is carried with corresponding NLRI in a BGP-LS packet in a form of a TLV. The BGP-LS attribute, mainly including a node attribute (node attribute), a link attribute, and a prefix attribute, belongs to a BGP optional non-transitive attribute.

When an IP network forwards traffic to a network device, it can be determined which network device is a next hop of the traffic only by querying an IP routing table on the network device. A user cannot clearly know a specific path of the traffic on a head node. Therefore, during network planning, the user usually needs to add a configuration on each network device to guide traffic. After traffic engineering such as SR is proposed, the user is given an ability to directly customize a complete traffic forwarding path. The prerequisite for this ability is that network topology information can be obtained.

The topology information can be classified into an intra-domain topology and an inter-domain topology. After collecting the topology information, a controller device computes an end-to-end traffic forwarding path, for example, an SR policy, based on the topology information, to guide traffic forwarding according to the specified path. Therefore, when the intra-domain topology and the inter-domain topology are collected, the controller device needs to correctly splice the two topologies.

Currently, when reporting the intra-domain topology information (IGP topology information) based on the BGP-LS, the network device uses an IPv4 local node identifier as a node identifier; and when reporting the inter-domain topology information (BGP topology information) based on the BGP-LS, the network device uses a BGP router-ID as a node identifier. The two node identifiers have different meanings, and there is no unified field in the BGP-LS packet as an association field. As a result, the controller device cannot directly use the BGP router-ID and the IPv4 local node identifier to splice the intra-domain topology and the inter-domain topology.

In a solution provided in the related art, the controller device queries forwarding device information by reading a configuration or by using a Network Configuration Protocol (NETCONF)/YANG (a data modeling language) interface, and then generates and obtains a mapping relationship between IGP information and BGP information. However, this solution has many defects. First, a BGP router-ID has to be configured, instead of being automatically selected. Second, there are problems in performance when obtaining NETCONF/YANG. Performance bottlenecks exist when there are a large quantity of devices. Third, the controller device needs to periodically query device information, this is because there is no active advertisement method when the device information changes.

In another solution provided in the related art, for example, a BGP router-ID is configured to be consistent with an IPv4 local node identifier (IPv4 router-ID, TLV 1028) in a route attribute in intra-domain topology information. Because BGP information is configured to be the same as IGP information, an inter-domain topology and an intra-domain topology are spliced. However, this solution also has many defects. First, a BGP router-ID has to be configured, instead of being automatically selected. Second, during device deployment, the BGP router-ID and the IPv4 local node identifier of each device have to be planned in advance. In this case, automatic deployment cannot be implemented, and there are great limitations.

In conclusion, currently, there is no method for dynamically obtaining an association relationship between BGP information (BGP router-ID) and an IPv4 local node identifier, and consequently automatic splicing of a BGP inter-domain topology and an IGP intra-domain topology cannot be implemented.

However, in some embodiments of this application, content information reported based on the BGP-LS is extended, so that the controller device dynamically obtains a node identifier of a network device. In this way, when computing an end-to-end forwarding path, the controller device can implement automatic splicing of a BGP inter-domain topology and an IGP intra-domain topology based on the node identifier. By implementing automatic splicing of the BGP inter-domain topology and the IGP intra-domain topology, benefits can be obtained in many application scenarios. For example, when a user deploys an SRv6 policy for traffic optimization, it is convenient for the controller device to compute an SRv6 policy path based on a spliced network topology. In another example, the controller device can display an end-to-end topology to a user.

The following describes a system running environment provided in embodiments of this application.

FIG. 1 is a schematic diagram of an architecture of a network system 10 according to an embodiment of this application. The network system 10 is an example of a networking architecture including a controller device and a network device. The network system 10 supports the controller device to implement functions of intra-domain topology collection and inter-domain topology collection.

In an example, the network system 10 includes a plurality of network devices and a controller device 11.

The network device is configured to collect topology information and send the topology information to the controller device 11. The network device is, for example, a switch or a router. The network device includes at least one protocol module such as an IGP protocol module and a BGP-LS protocol module. The IGP protocol module is configured to support the network device in communication based on an IGP protocol. The BGP-LS protocol module is configured to support the network device in communication based on a BGP-LS protocol.

The network device is classified into three types: an autonomous system boundary router (ASBR) device, a network-side edge (PE) device, and a customer-side edge (CE) device. The ASBR device includes an ASBR 1, an ASBR 2, an ASBR 3, and an ASBR 4. The ASBR 1, ASBR 2, ASBR 3, and ASBR 4 are all border routing devices of an AS 1 and an AS 2. The PE device includes a PE 1, a PE 2, a PE 3, and a PE 4. The CE device includes a CE 1 and a CE 2. Both the PE 1 and the PE 2 are connected to the CE 1. Both the PE 3 and the PE 4 are connected to the CE 2.

The PE 3, PE 4, ASBR 3, and ASBR 4 belong to the AS 1. An intra-domain topology of the AS 1 exists among the PE 3, PE 4, ASBR 3, and ASBR 4. The PE 1, PE 2, ASBR 1, and ASBR 2 belong to the AS 2. An intra-domain topology of the AS 2 exists among the PE 1, PE 2, ASBR 1, and ASBR 2. An inter-domain topology of the AS 1 and the AS 2 exists among the ASBR 3, ASBR 4, ASBR 1, and ASBR 2.

The following describes a relationship between different devices in the network system 10.

The PE 3, PE 4, ASBR 3, and ASBR 4 are interconnected based on an IGP protocol. An IGP neighbor relationship is established among the PE 3, PE 4, ASBR 3, and ASBR 4. The PE 3, the PE 4, the ASBR 3, and the ASBR 4 can exchange routing information based on the IGP neighbor relationship. The routing information indicates an intra-domain topology of the AS 1.

The PE 1, PE 2, ASBR 1, and ASBR 2 are interconnected based on an IGP protocol. IGP neighbors are established among the PE 1, PE 2, ASBR 1, and ASBR 2. The PE 1, the PE 2, the ASBR 1, and the ASBR 2 can exchange routing information based on the IGP neighbor relationship. The routing information indicates an intra-domain topology of the AS 2.

In an example, the ASBR 3 and the ASBR 1 each establish BGP-LS neighbors with the controller device. The ASBR 3 or the ASBR 1 can send a BGP-LS packet (for example, a BGP-LS update message) to the controller device based on the BGP-LS neighbor relationship. The BGP-LS packet sent by the ASBR 3 carries an intra-domain topology of the AS 1 and an inter-domain topology of the AS 1 and the AS 2. The ASBR 3 sends the BGP-LS packet to the controller device, to report the intra-domain topology of the AS 1 and the inter-domain topology of the AS 1 and the AS 2 to the controller device. The BGP-LS packet sent by the ASBR 1 carries an intra-domain topology of the AS 2 and an inter-domain topology of the AS 2 and the AS 1. The ASBR 1 sends the BGP-LS packet to the controller device, to report the intra-domain topology of the AS 2 and the inter-domain topology of the AS 2 and the AS 1 to the controller device.

In another example, the PE 3 and the PE 1 each establish BGP-LS neighbors with the controller device. The PE 3 or the PE 1 can report a BGP-LS packet (for example, a BGP-LS update message) to the controller device based on the BGP-LS neighbor relationship. The BGP-LS packet sent by the PE 3 carries an intra-domain topology of the AS 1 and an inter-domain topology of the AS 1 and the AS 2. The PE 3 sends the BGP-LS packet to the controller device, to report the intra-domain topology of the AS 1 and the inter-domain topology of the AS 1 and the AS 2 to the controller device. The BGP-LS packet sent by the PE 1 carries an intra-domain topology of the AS 2 and an inter-domain topology of the AS 2 and the AS 1. The PE 1 sends the BGP-LS packet to the controller device, to report the intra-domain topology of the AS 2 and the inter-domain topology of the AS 2 and the AS 1 to the controller device.

The PE 3 establishes BGP SR policy neighbors (for example, BGP SRv6 policy neighbors) with the controller device.

The controller device 11 is configured to: receive topology information from the network device, and perform path planning and path computation based on the topology information. The controller device 11 is, for example, a host, a server, a switch, or a router. A path computed by the controller device 11 includes at least one of an intra-domain path and an inter-domain path. The intra-domain path is, for example, a path in the AS 1 or a path in the AS 2. For example, the intra-domain path is an IGP path between the PE 3 and the ASBR 3. The inter-domain path is, for example, a path between the AS 1 and the AS 2. For example, the inter-domain path is an EPE path between the ASBR 3 and the ASBR 2.

In an example, the controller device 11 establishes a BGP-LS neighbor relationship with the ASBR device (for example, the ASBR 3 or the ASBR 1), and collects, based on the BGP-LS neighbor relationship, topology information sent by the ASBR device (for example, the ASBR 3 or the ASBR 1).

In another example, the controller device 11 establishes a BGP-LS neighbor relationship with the PE device (for example, the PE 3 or the PE 1), and collects, based on the BGP-LS neighbor relationship, topology information sent by the PE device (for example, the PE 3 or the PE 1).

In the network system 10 shown in FIG. 1, when collecting topology information through BGP-LS neighbors, the controller device 11 not only collects an intra-domain topology (for example, an intra-domain topology of the AS 1 or an intra-domain topology of the AS 2), but also collects an inter-domain topology (for example, an inter-domain topology of the AS 1 and the AS 2). In this scenario, by implementing the technical solutions provided in embodiments of this application, the controller device 11 can associate the intra-domain topology with the inter-domain topology.

The foregoing describes the system running environment by using an example. The following describes a method procedure provided in embodiments of this application.

Figure 2:
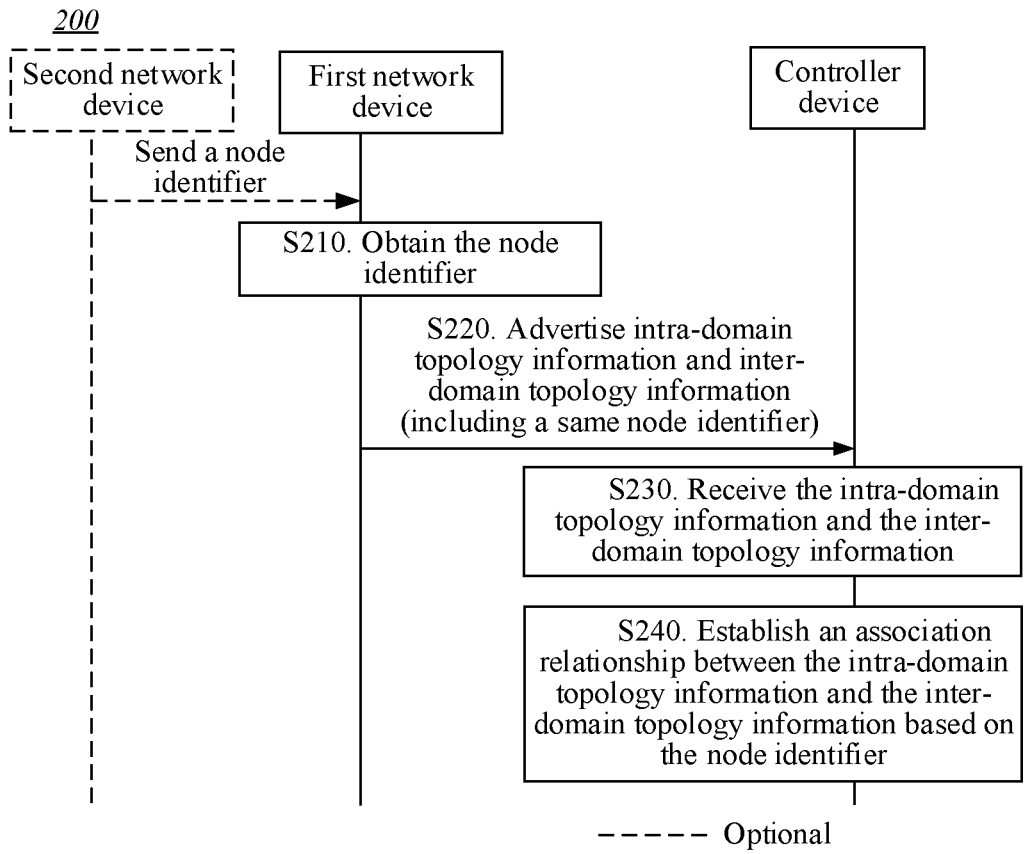
FIG. 2 is a flowchart of a method for advertising topology information according to an embodiment of this application.

FIG. 2 is a flowchart of a method 200 for advertising topology information according to an embodiment of this application. The method 200 is described by using an example in which a device for sending topology information is a first network device. Interaction bodies of the method 200 include the first network device and a controller device.

The first network device is, for example, a switch or a router. The first network device is, for example, an ASBR device, a PE device, or a route reflector (RR) device. The controller device is, for example, a host, a server, or a personal computer.

For brevity, in the following, a domain to which the first network device belongs is referred to as a first domain, and another domain other than the domain to which the first network device belongs is referred to as a second domain. For example, the first network device is the PE 3 or the ASBR 3 in the system running environment shown in FIG. 1, the first domain is the AS 1, and the second domain is the AS 2.

Optionally, if the first network device is not an ASBR device, the interaction bodies of the method 200 further include a second network device. The second network device and the first network device belong to a same domain. The second network device is a border routing device in the domain to which the first network device belongs. For example, the first network device is the PE 3 in the system running environment shown in FIG. 1, and the second network device is the ASBR 3.

For example, the method 200 includes the following S210 to S240.

S210. A first network device obtains a node identifier.

A relationship between the node identifier (the node identifier included in topology information) obtained by the first network device and the first network device (the device that sends the topology information) includes a plurality of cases. The following uses two cases as examples for description. The following Case 1 supports a scenario in which the first network device is an ASBR device. The following Case 2 supports a scenario in which the first network device is not an ASBR device. For example, when the controller device establishes BGP-LS neighbors with an ASBR device, the following Case 1 is triggered; and when the controller device establishes BGP-LS neighbors with a non-ASBR device, the following Case 2 is triggered.

Case 1: The node identifier is a node identifier of a device that sends topology information.

In Case 1, a network device includes a node identifier of the network device in topology information and sends the topology information to the controller device. The node identifier in the topology information identifies the device that sends the topology information. With reference to a scenario in which the first network device sends topology information, step S210 is, for example, obtaining, by the first network device, the node identifier of the first network device, where the node identifier identifies the first network device.

Case 2: The node identifier included in the topology information is a node identifier of another device that belongs to a same domain as the device that sends the topology information.

In Case 2, a network device includes a node identifier of another device in the domain to which the network device belongs in topology information, and sends the topology information to the controller device. In an example, the network device obtains a node identifier of a border routing device in the domain, includes the node identifier of the border routing device in topology information, and sends the topology information to the controller device. With reference to a scenario in which the first network device sends topology information, step S210 is, for example, obtaining, by the first network device, the node identifier of the second network device, where the node identifier identifies the second network device. The second network device belongs to the first domain, and the second network device is a border routing device of the first domain and the second domain.

With reference to Case 1 described above, the node identifier in S210 includes one or more of the following: a BGP node identifier of the first network device, a TE node identifier of the first network device, a system-ID of the first network device, an IPv4 local node identifier of the first network device, and an IPv6 local node identifier of the first network device.

With reference to Case 2 described above, the node identifier in S210 includes one or more of the following: a BGP node identifier of the second network device, a TE node identifier of the second network device, a system-ID of the second network device, an IPv4 local node identifier of the second network device, and an IPv6 local node identifier of the second network device.

S220. The first network device advertises intra-domain topology information and inter-domain topology information to a controller device based on the node identifier.

With reference to a scenario in which the first network device belongs to the first domain, the intra-domain topology information advertised by the first network device indicates a topology in the first domain. The inter-domain topology information advertised by the first network device indicates a topology between the first domain and the second domain. With reference to Case 1 described above, both the intra-domain topology information and the inter-domain topology information include the node identifier of the first network device. With reference to Case 2 described above, both the intra-domain topology information and the inter-domain topology information include the node identifier of the second network device.

In an example, the first network device sends the topology information based on a BGP-LS protocol. In an example, the first network device generates a first BGP-LS packet, and the first network device sends the first BGP-LS packet to the controller device. The first BGP-LS packet includes the topology information, and the topology information in the first BGP-LS packet includes the node identifier described above. In an example, the first BGP-LS packet is a BGP-LS update packet. In an example, the first network device converts the topology information into a BGP-LS route, to generate the first BGP-LS packet.

The first BGP-LS packet includes at least one of the intra-domain topology information or the inter-domain topology information. In other words, content of the first BGP-LS packet may be the intra-domain topology information, or may be the inter-domain topology information, or may include both the intra-domain topology information and the inter-domain topology information. The following describes, by using Case A and Case B, possible cases in which the topology information in the first BGP-LS packet is involved.

Case A: The first network device encapsulates the intra-domain topology information and the inter-domain topology information respectively into different BGP-LS packets.

In an example, the first network device separately sends the intra-domain topology information and the inter-domain topology information to the controller device through a plurality of BGP-LS packets. In this manner, the first BGP-LS packet includes the following Case A-1 and Case A-2.

Case A-1: The first BGP-LS packet includes the intra-domain topology information but does not include the inter-domain topology information.

In an example, the first network device generates the first BGP-LS packet based on the intra-domain topology information including the node identifier. In addition, the first network device further generates a fourth BGP-LS packet based on the inter-domain topology information including the node identifier. The first BGP-LS packet includes the intra-domain topology information, and the fourth BGP-LS packet includes the inter-domain topology information. The intra-domain topology information in the first BGP-LS packet and the inter-domain topology information in the fourth BGP-LS packet include a same node identifier.

Case A-2: The first BGP-LS packet includes the inter-domain topology information but does not include the intra-domain topology information.

In an example, the first network device generates the first BGP-LS packet based on the inter-domain topology information including the node identifier. In addition, the first network device further generates a fourth BGP-LS packet based on the intra-domain topology information including the node identifier. The first BGP-LS packet includes the inter-domain topology information, and the fourth BGP-LS packet includes the intra-domain topology information. The inter-domain topology information in the first BGP-LS packet and the intra-domain topology information in the fourth BGP-LS packet include a same node identifier.

A time sequence of sending the intra-domain topology information and the inter-domain topology information in Case A described above is not limited in the embodiments. In an example, the first network device first sends the intra-domain topology information, and then sends the inter-domain topology information. In an example, the first network device first sends the BGP-LS packet including the intra-domain topology information to the controller device, and then sends the BGP-LS packet including the inter-domain topology information to the controller device. In another example, the first network device first sends the inter-domain topology information, and then sends the intra-domain topology information. In an example, the first network device first sends the BGP-LS packet including the inter-domain topology information to the controller device, and then sends the BGP-LS packet including the intra-domain topology information to the controller device.

Case B: The first network device encapsulates the intra-domain topology information and the inter-domain topology information into a same BGP-LS packet.

In an example, the first network device generates the first BGP-LS packet based on the intra-domain topology information and the inter-domain topology information that include a same node identifier. The first BGP-LS packet includes the intra-domain topology information and the inter-domain topology information. For example, if the intra-domain topology information and the inter-domain topology information correspond to a same route attribute, and the intra-domain topology information and the inter-domain topology information correspond to different route prefixes, the first network device packs the intra-domain topology information and the inter-domain topology information into a same BGP-LS update packet (the first BGP-LS packet).

As described in (15) in the foregoing term description section, the BGP-LS involves many route types. There is a plurality of implementations for the first network device to include the node identifier by using which type of BGP-LS route. The following describes, by using an example of a route type 1 to a route type 4, a route type for carrying the node identifier.

Route type 1: A route type for carrying the node identifier is a BGP-LS node route.

The first network device encapsulates the node identifier into the BGP-LS node route, to generate the first BGP-LS packet. The first BGP-LS packet includes the BGP-LS node route, and the BGP-LS node route includes the node identifier.

Route type 2: A route type for carrying the node identifier is a newly added BGP-LS route type.

In this embodiment, a BGP-LS route type is newly added, and the newly added BGP-LS route type is used to report global device information.

The global device information includes one or more types of node identifiers. For example, the global device information includes at least two of the following: a BGP node identifier, a TE node identifier, a system-ID, an IPv4 local node identifier, and an IPv6 local node identifier. Optionally, the global device information further includes other device information other than the node identifier.

For ease of description, the newly added BGP-LS route type is referred to as a target route type below. The target route type is a type of BGP-LS route that carries the global device information. The first network device encapsulates the node identifier into a target BGP-LS route, to generate the first BGP-LS packet. The first BGP-LS packet includes the target BGP-LS route, and the BGP-LS route of the target route type includes a route prefix and a route attribute. The route attribute in the BGP-LS route of the target route type includes the global device information. For a general packet format of the target BGP-LS route, refer to related descriptions in Table 4.

For example, the target route type is referred to as a physical node (physical node) route. The physical node route includes a physical node NLRI field and a physical node attribute field. The physical node NLRI field carries a route prefix. The physical node NLRI field includes an NLRI type value. The NLRI type value in the physical node NLRI field is different from an NLRI type value in an existing BGP-LS route (for example, a BGP-LS node route, a BGP-LS link route, or the like). The NLRI type value in the physical node NLRI field identifies that a type of a BGP-LS route is a physical node route. The physical node attribute field carries a route attribute. The physical node attribute field includes global device information.

ABGP-LS route type for reporting global device information is newly added. Therefore, in various scenarios, such as reporting a topology in a pure IPv6 network, reporting a topology in a BGP SR network, reporting link information of a static route, and reporting direct link information, topology association can be performed by using a node identifier carried based on the newly added BGP-LS route type, so that data among data sources can be interconnected. For example, when a BGP SR topology is reported based on the BGP-LS, a BGP router-ID may be carried based on a newly added route type. When link information of a static route is reported based on the BGP-LS, a system-ID may be carried based on a newly added route type. As the BGP router-ID and the system-ID are reported to the controller device based on the newly added route type, the controller device can associate the topology information of the BGP SR network with the link information of the static route based on the BGP router-ID and system-ID.

Route type 3: A route type for carrying the node identifier is a BGP-LS link route.

For example, the first network device encapsulates the node identifier into the BGP-LS link route, to generate the first BGP-LS packet. The first BGP-LS packet includes the BGP-LS link route, and the BGP-LS link route includes the node identifier.

Route type 4: A route type for carrying the node identifier is a BGP-LS SRv6 SID route.

For example, the first network device encapsulates the node identifier into the BGP-LS SRv6 SID route, to generate the first BGP-LS packet. The first BGP-LS packet includes the BGP-LS SRv6 SID route, and the BGP-LS SRv6 SID route includes the node identifier.

The manners described in the route type 3 and the route type 4 facilitate support of an egress peer traffic engineering (egress peer engineering, EPE) scenario. In an example, in an EPE scenario, the first network device needs to advertise peer-node (peer-node) information and peer-adjacency (peer-adjacency, peer-adj) information to the controller device. When advertising the peer-node information, the first network device may include the node identifier in the BGP-LS link route or the BGP-LS SRv6 SID route. When advertising the peer-adj information, the first network device may include the node identifier in the BGP-LS link route.

The foregoing describes, based on the route type 1 to the route type 4, several possible BGP-LS route types for carrying the node identifier. There is a plurality of manners for carrying the node identifier in the BGP-LS routes described above. In an example, a node identifier is carried by a TLV in a route attribute field. In an example, the route attribute field in the first BGP-LS packet includes a node identifier TLV.

The node identifier TLV refers to a TLV that carries any node identifier described above. The node identifier TLV includes a type field, a length field, and a value field. The type field in the node identifier TLV includes a type of the node identifier TLV. The type of the node identifier TLV identifies that the node identifier TLV carries the node identifier. The length field in the node identifier TLV includes a length of the node identifier. The value field in the node identifier TLV includes the node identifier. In an example, the node identifier TLV is a sub-TLV. The sub-TLV refers to a TLV included in another TLV.

That the node identifier TLV is carried in which route attribute field is not limited in the embodiments. In an example, the node identifier TLV is carried in a node attribute (node attribute) field in the first BGP-LS packet. In another example, the node identifier TLV is carried in a link attribute field in the first BGP-LS packet.

There is a plurality of manners for implementing the node identifier TLV. The following uses an example of an implementation I and an implementation II for description.

Implementation I: A type of TLV is newly added as the node identifier TLV.

In an example, a TLV for carrying a node identifier is newly added in a route attribute of the BGP-LS.

For example, when the node identifier is a BGP router-ID, a type of TLV is newly added in the route attribute of the BGP-LS to carry the BGP router-ID. In an example, the node identifier TLV is a BGP node identifier TLV. A type of the BGP node identifier TLV identifies that the TLV carries the BGP router-ID. A value of the BGP node identifier TLV includes the BGP router-ID. For example, a format of the BGP node identifier TLV is shown in the following Table 1.

TABLE 1

| sub-TLV type (BGP router-ID) | length = 4 |
|---|---|
| BGP router identifier | |

The sub-TLV type in Table 1 indicates a type field of the BGP node identifier TLV. A value of the sub-TLV type field indicates that the TLV is a TLV carrying the BGP router-ID. The length in Table 1 indicates a length field of the BGP node identifier TLV. In Table 1, description is made by using an example in which a value of the length field is 4.

The BGP node identifier TLV may be combined with the various route types described above in any manner. The following describes some combination manners in detail.

With reference to the route type 1 described above, the BGP node identifier TLV is carried in a BGP-LS node route. The first BGP-LS packet includes the BGP-LS node route, and the BGP-LS node route includes the BGP node identifier TLV. For example, a route attribute field in the BGP-LS node route includes the BGP node identifier TLV. In this manner, the BGP node identifier may be understood as a sub-attribute in a route attribute in the BGP-LS node route.

With reference to the route type 2 described above, the BGP node identifier TLV is carried based on a newly added BGP-LS route type. In an example, the first BGP-LS packet includes a BGP-LS route of a target route type, and the BGP-LS route of the target route type includes the BGP node identifier TLV. For example, a route attribute field of the target route type includes the BGP node identifier TLV. In this manner, the BGP node identifier may be understood as a sub-attribute in a route attribute in the newly added type of BGP-LS route.

With reference to the route type 3 described above, the BGP node identifier TLV is carried in a BGP-LS link route. The first BGP-LS packet includes the BGP-LS link route, and the BGP-LS link route includes the BGP node identifier TLV. For example, a route attribute field in the BGP-LS link route includes the BGP node identifier TLV. In this manner, the BGP node identifier may be understood as a sub-attribute in a route attribute in the BGP-LS link route.

With reference to the route type 4 described above, the BGP node identifier TLV is carried in a BGP-LS SRv6 SID route. The first BGP-LS packet includes the BGP-LS SRv6 SID route, and the BGP-LS SRv6 SID route includes the BGP node identifier TLV. For example, a route attribute field in the BGP-LS SRv6 SID route includes the BGP node identifier TLV. In this manner, the BGP node identifier may be understood as a sub-attribute in a route attribute in the BGP-LS SRv6 SID route.

The foregoing describes, by using an example of the BGP node identifier TLV, how to newly add a TLV in the route attribute of the BGP-LS to carry the node identifier. With reference to various types of node identifiers, the BGP node identifier TLV may be replaced with another type of node identifier TLV, for example, the BGP node identifier TLV is replaced with a system-ID TLV, a TE node identifier TLV, or the like. The following uses the system-ID TLV as an example for a detailed description.

For example, when the node identifier is a system-ID, a type of TLV is newly added in the route attribute of the BGP-LS to carry the system-ID. In an example, the node identifier TLV is a system-ID TLV. A type of the system-ID TLV identifies that the TLV carries the system-ID. A value of the system-ID TLV includes the system-ID. For example, a format of the system-ID TLV is shown in the following Table 2.

TABLE 2

| sub-TLV type (system-router-ID) | length = 4 or 16 |
|---|---|
| system router identifier | |

The sub-TLV type in Table 2 indicates a type field of the system-ID TLV. A value of the sub-TLV type field indicates that the TLV is a TLV carrying the system-ID. The length in Table 2 indicates a length field of the system-ID TLV. In Table 2, description is made by using an example in which a value of the length field is 4 or 16.

The system-ID TLV may be combined with the various route types described above in any manner. The following describes some combination manners in detail.

With reference to the route type 1 described above, the system-ID TLV is carried in a BGP-LS node route. The first BGP-LS packet includes the BGP-LS node route, and the BGP-LS node route includes the system-ID TLV. For example, a route attribute field in the BGP-LS node route includes the system-ID TLV. In this manner, the system-ID may be understood as a sub-attribute in a route attribute in the BGP-LS node route.

With reference to the route type 2 described above, the system-ID TLV is carried based on a newly added BGP-LS route type. In an example, the first BGP-LS packet includes a BGP-LS route (physical node route) of a target route type, and the BGP-LS route of the target route type includes the system-ID TLV. For example, a route attribute field of the target route type includes the system-ID TLV. In this manner, the system-ID may be understood as a sub-attribute in a route attribute in the newly added type of BGP-LS route.

With reference to the route type 3 described above, the system-ID TLV is carried in a BGP-LS link route. The first BGP-LS packet includes the BGP-LS link route, and the BGP-LS link route includes the system-ID TLV. For example, a route attribute field in the BGP-LS link route includes the system-ID TLV. In this manner, the system-ID may be understood as a sub-attribute in a route attribute in the BGP-LS link route. For a format of the BGP-LS link route, refer to related descriptions in Table 5.

With reference to the route type 4 described above, the system-ID TLV is carried in a BGP-LS SRv6 SID route. The first BGP-LS packet includes the BGP-LS SRv6 SID route, and the BGP-LS SRv6 SID route includes the system-ID TLV. For example, a route attribute field in the BGP-LS SRv6 SID route includes the system-ID TLV. In this manner, the system-ID may be understood as a sub-attribute in a route attribute in the BGP-LS SRv6 SID route.

Implementation II: A TLV of a defined type is continuously used as the node identifier TLV.

For example, if the node identifier is an IPv4 local node identifier (IPv4 router-ID of local node), the node identifier TLV is a router IPv4 identifier TLV (IPv4 router-ID of local node TLV). A type field in the router IPv4 identifier TLV includes 1028, that is, a type value is 1028. A value field in the router IPv4 identifier TLV includes the IPv4 local node identifier.

For example, if the node identifier is an IPv6 local node identifier (IPv6 router-ID of local node), the node identifier TLV is a router IPv6 identifier TLV (IPv6 router-ID of local node TLV). A type field in the router IPv6 identifier TLV includes 1029, that is, a type value is 1029. A value field in the router IPv6 identifier TLV includes the IPv6 local node identifier.

For detailed descriptions of the two types of TLVs, namely, the router IPv4 identifier TLV and the IPv4 router-ID of local node TLV, refer to RFC 7752. Details are not described herein again.

The foregoing describes possible implementations of the node identifier TLV through the implementation I and the implementation II. A quantity of node identifier TLVs in one BGP-LS packet is not limited in the embodiments. For example, the first BGP-LS packet includes one or more node identifier TLVs. In an example, the first BGP-LS packet includes a plurality of types of node identifier TLVs, and each type of node identifier TLV carries one type of node identifier. For example, the first BGP-LS packet includes a BGP node identifier TLV and a system-ID TLV. In this manner, a plurality of types of node identifiers of a same device can be reported together to the controller device by using one BGP-LS packet.

S230. The controller device receives the intra-domain topology information and the inter-domain topology information from the first network device.

The controller device receives the first BGP-LS packet from the first network device. The controller device obtains at least one of the intra-domain topology information or the inter-domain topology information from the first BGP-LS packet.

In an example, in Case A, the controller device not only receives the first BGP-LS packet, but also receives the fourth BGP-LS packet. In Case A-1, the controller device obtains the intra-domain topology information from the first BGP-LS packet, and obtains the inter-domain topology information from the fourth BGP-LS packet. In Case A-2, the controller device obtains the inter-domain topology information from the first BGP-LS packet, and obtains the intra-domain topology information from the fourth BGP-LS packet. In Case B, the controller device receives the first BGP-LS packet, and the controller device obtains the intra-domain topology information and the inter-domain topology information from the first BGP-LS packet.

S240. The controller device establishes an association relationship between the intra-domain topology information and the inter-domain topology information based on the node identifier.

As the intra-domain topology information and the inter-domain topology information include a same node identifier, the controller device may use the node identifier as an association field of the intra-domain topology information and the inter-domain topology information, and splice the intra-domain topology information and the inter-domain topology information.

For example, when the node identifier is a BGP router-ID, IGP intra-domain topology information collected by the controller device based on the BGP-LS includes the BGP router-ID. Inter-domain link information collected by the controller device based on the BGP-LS also includes the BGP router-ID. The controller device may associate an intra-domain topology with an inter-domain topology based on the BGP router-ID.

In another example, when the node identifier is an IPv4 local node identifier, inter-domain topology information collected by the controller device based on the BGP-LS includes the IPv4 local node identifier. Intra-domain link information collected by the controller device based on the BGP-LS also includes the IPv4 local node identifier. The controller device may associate an intra-domain topology with an inter-domain topology based on the IPv4 local node identifier.

In another example, when the node identifier is a system-ID, inter-domain topology information collected by the controller device based on the BGP-LS includes the system-ID. Intra-domain link information collected by the controller device based on the BGP-LS also includes the system-ID.

The controller device may associate an intra-domain topology with an inter-domain topology based on the system-ID.

With reference to the route type 2 described above, the controller device obtains global device information from the first BGP-LS packet. The controller device generates a mapping relationship table based on the global device information. The mapping relationship table includes mapping relationships between different types of node identifiers of a same device (for example, the first network device or the second network device). For example, the mapping relationship table is shown in Table 3 below. When collecting the inter-domain link information and the intra-domain link information based on the BGP-LS, the controller device may implement link splicing according to the mapping relationship table based on the BGP router-ID in an inter-domain link and the TE router-ID carried in an IPv4 router-ID of local node field of an intra-domain IGP.

TABLE 3

| BGP router-ID | TE router-ID | system-ID |
| --- | --- | --- |

According to the method provided in the embodiments, when a network device sends a topology, intra-domain topology information and inter-domain topology information carry a same node identifier, so that a controller device can automatically associate the intra-domain topology information with the inter-domain topology information based on the received node identifier, reducing complexity of network configuration, thereby improving efficiency of topology collection by the controller device.

Further, this helps the controller device automatically implement normal splicing of an intra-domain link and an inter-domain link, so that the controller device can compute end-to-end topology or path information.

Further, the controller device does not need to obtain a mapping relationship between the IPv4 local node identifier and the BGP node identifier by reading a configuration such as NETCONF/YANG, thereby reducing configuration operations.

Further, when the controller device collects topology information, the network device does not need to impose a mandatory requirement on consistency between the IPv4 local node identifier and the BGP node identifier, thereby improving flexibility.

In the foregoing method 200, there is a plurality of implementations for obtaining the node identifier by the first network device. The following uses an example of an implementation (1) and an implementation (2) for description. The implementation (1) supports a case in which the first network device is an ASBR device. The implementation (2) supports a case in which the first network device is not an ASBR device but the second network device is an ASBR device.

Implementation (1): The first network device obtains a locally stored node identifier.

In an example, the first network device obtains the node identifier by using one or more protocol modules of the first network device. For example, a BGP protocol module in the first network device collects a BGP node identifier, a system-ID, and a TE node identifier of the first network device.

In an example, the first network device includes protocol modules corresponding to a plurality of protocol types, and different protocol modules in the first network device interact with each other to obtain the node identifier. For example, a BGP-LS protocol module in the first network device collects an IPv4 local node identifier or an IPv6 local node identifier from an IGP protocol module. In another example, an IGP protocol module in the first network device collects a BGP node identifier from a BGP protocol module.

Implementation (2): The first network device interacts with the second network device to obtain a node identifier.

The second network device sends a node identifier of the second network device to the first network device, so that the first network device obtains the node identifier of the second network device. In an example, the second network device advertises the node identifier to the first network device, and the first network device receives the node identifier sent by the second network device. The node identifier identifies the second network device.

There is a plurality of implementations for advertising the node identifier by the second network device. The following uses an example of an implementation (2-1) and an implementation (2-2) for description.

Implementation (2-1): The second network device advertises a node identifier based on an IGP protocol.

In an example, the second network device generates an IGP packet. The IGP packet includes the node identifier of the second network device. The second network device floods the IGP packet in a first domain (an IGP domain). The first network device receives the IGP packet sent by the second network device. The first network device obtains the node identifier of the second network device from the IGP packet.

For example, if the node identifier is a BGP node identifier, an example process of the implementation A includes: collecting, by an IGP protocol module in the second network device, a BGP router-ID from a BGP protocol module of the second network device. When the IGP protocol module in the second network device floods an LSDB, the IGP protocol module in the second network device includes the collected BGP router-ID in an IGP packet, and floods the IGP packet to a neighbor (the first network device). When receiving the IGP packet, the first network device obtains the BGP router-ID from the IGP packet, and stores the BGP router-ID into the LSDB.

The second network device floods the IGP packet carrying the BGP router-ID, so that each device (for example, the first network device) in the IGP domain can obtain the BGP router-ID of the second network device through the IGP packet. In this case, when the controller device establishes BGP-LS neighbors with the first network device but does not establish BGP-LS neighbors with the second network device, because the first network device has the BGP router-ID of the second network device, the first network device is responsible for sending the BGP router-ID of the second network device to the controller device through a BGP-LS packet, so that it can be ensured that the controller device can obtain the BGP router-ID of the second network device, thereby helping get rid of a limitation caused by a networking architecture.

There is a plurality of manners for carrying the node identifier in the IGP packet. In an example, a TLV is newly added in the IGP packet to carry the node identifier. In an example, the IGP packet sent by the second network device includes a node identifier TLV. The node identifier TLV is, for example, carried in a link-state advertisement (LSA) packet in an IGP protocol. For example, if the node identifier is a BGP node identifier, the IGP packet includes a BGP node identifier TLV. For a format of the BGP node identifier TLV, refer to related descriptions in Table 1. By carrying the BGP node identifier TLV in the IGP packet, the BGP node identifier can be used as an attribute of IGP flooding, to perform flooding in the domain based on the IGP.

Implementation (2-2): The second network device advertises a node identifier based on a BGP-LS protocol.

In an example, the second network device generates a second BGP-LS packet. The second network device sends the second BGP-LS packet to the first network device based on a BGP-LS neighbor relationship between the second network device and the first network device.

The second BGP-LS packet includes the node identifier of the second network device.

The second BGP-LS packet may be combined with any features related to the four route types described above. For example, with reference to the route type 1, the second BGP-LS packet includes a BGP-LS node route, and the BGP-LS node route includes the node identifier of the second network device. With reference to the route type 2, the second BGP-LS packet includes a BGP-LS route of a target route type, the BGP-LS route of the target route type includes global device information, and the global device information includes the node identifier of the second network device. With reference to the route type 3, the second BGP-LS packet includes a BGP-LS link route, and the BGP-LS link route includes the node identifier of the second network device. With reference to the route type 4, the second BGP-LS packet includes an SRv6 SID route, and the SRv6 SID route includes the node identifier of the second network device.

The second BGP-LS packet may be combined with any features related to the node identifier TLV described above. For example, a route attribute field in the second BGP-LS packet includes a node identifier TLV. The node identifier TLV includes but is not limited to at least one of a BGP node identifier TLV, a system-ID TLV, a router IPv4 identifier TLV, and a router IPv6 identifier TLV.

A manner of carrying the node identifier in the second BGP-LS packet is similar to a manner of carrying the node identifier in the first BGP-LS packet. For implementation details, refer to the foregoing description of the first BGP-LS packet.

In the foregoing method 200, there is a plurality of implementations for obtaining the inter-domain topology information by the first network device. For example, when the first network device is an ASBR device, the first network device collects the inter-domain topology information. In another example, when the first network device is not an ASBR device but the second network device is an ASBR device, the first network device receives the inter-domain topology information sent by the second network device. In an example, the second network device generates a third BGP-LS packet, where the third BGP-LS packet includes the inter-domain topology information. The second network device sends the third BGP-LS packet to the first network device. The first network device receives the third BGP-LS packet sent by the second network device. The first network device obtains the inter-domain topology information from the third BGP-LS packet. The third BGP-LS packet is, for example, a BGP-LS update packet.

The foregoing method 200 is described using an example in which a same device (the first network device) is responsible for sending the intra-domain topology information and the inter-domain topology information. In another example, the intra-domain topology information and the inter-domain topology information are respectively sent by different devices. The following provides a detailed description.

For example, the first network device sends the intra-domain topology information to the controller device, and the second network device sends the inter-domain topology information to the controller device. The controller device receives the intra-domain topology information from the first network device, and the controller device receives the inter-domain topology information sent by the second network device. The intra-domain topology information sent by the first network device and the inter-domain topology information sent by the second network device include a same node identifier.

In another example, the first network device sends the inter-domain topology information to the controller device, and the second network device sends the intra-domain topology information to the controller device. The controller device receives the inter-domain topology information from the first network device, and the controller device receives the intra-domain topology information sent by the second network device. The inter-domain topology information sent by the first network device and the intra-domain topology information sent by the second network device include a same node identifier.

A manner of sending the topology information by the second network device is similar to a manner of sending the topology information by the first network device. For technical details, refer to the description of sending the topology information by the first network device.

The foregoing method 200 is described by using an example in which the topology information is sent based on a BGP-LS protocol. In another example, topology information is sent in another manner other than the BGP-LS protocol. For example, the topology information is sent based on a Path Computation Element Communication Protocol (PCEP). In an example, a network device collects the topology information, generates a PCEP packet based on the topology information, and sends the PCEP packet to the controller device. The PCEP packet carries a node identifier. In another example, a network device advertises intra-domain topology information and inter-domain topology information to the controller device based on a NETCONF protocol.

The following describes in detail a packet format that includes a newly added BGP-LS route type.

Refer to Table 4. Table 4 is an example of a BGP-LS packet format. The BGP-LS packet shown in Table 4 includes a BGP-LS route of a target route type. An IPv4 router-ID, an IPv6 router-ID, and a system-ID in Table 4 are examples of global device information.

TABLE 4

| General packet format | | 0-4 | 5-8 | 9-12 | 13-16 | 17-20 | 21-24 25-28 29-32 |
|---|---|---|---|---|---|---|---|
| Physical node network layer reachability information | / | NLRI type = 1 (physical node NLRI) | | | | | NLRI length |
| | | Protocol ID | | | | / | |
| | | | | Identifier | | | |
| | Local node description information | Type = 256 (local node description information) | | | | | Length |
| | | Sub-TLV type = 512 (AS) | | | | | Length = 4 |
| | | | | AS number | | | |
| | | Sub-TLV type = 513 (BGP-LS identifier) | | | | | Length = 4 |
| | | | | BGP-LS ID | | | |
| | | Sub-TLV type = 516 (BGP router-ID) | | | | | Length =4 |
| | | | | BGP router identifier | | | |
| Physical node attribute | Attribute | Attribute flag | Attribute type | Attribute length | | | / |
| | | Sub-TLV type = 1028 (IPv4 router-ID of local node) | | | | | Length = 4 |
| | | | | IPv4 router-ID | | | |
| | | Sub-TLV type = 1029 (IPv6 router-ID of local node) | | | | | Length = 16 |
| | | | | IPv6 router-ID | | | |
| | | Sub-TLV type (system-ID) | | | | | Length = 4 |
| | | | | system-ID | | | |
| | | | | Other sub-TLVs | | | |

Numbers such as 0-4 and 5-8 in the first row of Table 4 represent bits. For example, a protocol ID field is located in bit 0 to bit 8. Meanings of the fields in Table 4 are described below.

(1) Physical Node NLRI

The physical node NLRI belongs to node NLRI. The physical node NLRI includes an NLRI type field, an NLRI length field, a protocol ID field, an identifier field, and a local node description information field.

(1-1) A value of the NLRI type field indicates that the NLRI type is the physical node NLRI. For example, if a value of the NLRI type field is 1, it indicates that the NLRI is physical node NLRI.

(1-2) A value of the NLRI length field indicates a length of the physical node NLRI. The value of the NLRI length field is a variable (var).

(1-3) A value of the protocol ID field indicates a protocol number of a source of topology information, for example, IS-IS, OSPF, or BGP. A length of the protocol ID field is 1 byte.

(1-4) The identifier field identifies different protocol instances. A length of the identifier field is 4 bytes.

(1-5) The local node description information includes a type field, a length field, an autonomous system sub-TLV (AS sub-TLV), and a BGP-LS identifier sub-TLV.

A value of the type field in the local node description information indicates that the type of the information is the local node description information. For example, the value of the type field in the local node description information is 256. A value of the length field in the local node description information indicates a length of the local node description information. The value of the length field in the local node description information is a var.

The AS sub-TLV includes a sub-TLV type field, a length field, and an AS field. A value of the sub-TLV type field in the AS sub-TLV identifies that the sub-TLV type is the AS sub-TLV. For example, if the value of the sub-TLV type field is 512, it indicates that the sub-TLV is an AS sub-TLV. A value of the length field indicates a length of a value part in the AS sub-TLV. For example, a value of the length field is 4. The AS field belongs to the value part of the AS sub-TLV. A value of the AS field identifies an AS to which a network device belongs. In an example, a value of the AS field is a 32-bit AS number.

The BGP-LS identifier sub-TLV includes a sub-TLV type (sub-TLV type) field, a length field, and a BGP-LS identifier (BGP-LS ID) field. A value of the sub-TLV type field in the BGP-LS identifier sub-TLV identifies that the sub-TLV type is the BGP-LS identifier sub-TLV. For example, a value of the sub-TLV type field in the BGP-LS identifier sub-TLV is 513, indicating that the sub-TLV is the BGP-LS identifier sub-TLV. A value of the length field indicates a length of a value part in the BGP-LS identifier sub-TLV. For example, a value of the length field is 4. The BGP-LS identifier field belongs to the value part of the BGP-LS identifier sub-TLV. A value of the BGP-LS identifier field is a BGP-LS identifier to which a network device belongs. For example, a value of the BGP-LS identifier field is a 32-bit ID.

(2) Physical Node Attribute

The physical node attribute includes an attribute flag field, an attribute type field, an attribute length field, a router IPv4 identifier TLV, a router IPv6 identifier TLV, and a system-ID TLV.

The router IPv4 identifier TLV includes a sub-TLV type field, a length field, and a router IPv4 identifier (IPv4 router-ID) field. A value of the sub-TLV type field identifies that the sub-TLV type is the router IPv4 identifier TLV. For example, a value of the sub-TLV type field is 1028, indicating that the sub-TLV is the router IPv4 identifier TLV. A value of the length field indicates a length of a value part in the router IPv4 identifier TLV. For example, a value of the length field is 4. The router IPv4 identifier field belongs to the value part of the router IPv4 identifier TLV. A value of the router IPv4 identifier field is the router IPv4 identifier of a local node.

The router IPv6 identifier TLV includes a sub-TLV type field, a length field, and a router IPv6 identifier (IPv6 router-ID) field. A value of the sub-TLV type field identifies that the sub-TLV type is the router IPv6 identifier TLV. For example, a value of the sub-TLV type field in the router IPv6 identifier TLV is 1029, indicating that the sub-TLV is the router IPv6 identifier TLV. A value of the length field indicates a length of a value part in the router IPv6 identifier TLV. For example, a value of the length field is 16. The router IPv6 identifier field belongs to the value part of the router IPv6 identifier TLV. A value of the router IPv6 identifier field is the router IPv6 identifier of a local node.

The system-ID TLV includes a sub-TLV type field, a length field, and a system identifier (IPv6 system-ID) field. A value of the sub-TLV type field identifies that the sub-TLV type is the system-ID TLV. A value of the length field indicates a length of a value part in the system-ID TLV. For example, a value of the length field is 4. The system identifier field belongs to the value part of the system-ID TLV. A value of the system identifier field is the system identifier of a local node.

The following describes a packet format of a BGP-LS packet including a node identifier TLV.

Refer to Table 5. Table 5 is an example of a BGP-LS packet format. The BGP-LS packet shown in Table 5 includes a BGP-LS link route. The BGP-LS link route includes a link attribute field. The link attribute field includes an attribute flag (attribute flag) field, an attribute type field, an attribute length field, a router IPv4 identifier TLV, a router IPv6 identifier TLV, an administrative group TLV, a maximum link bandwidth TLV, a TE default cost TLV (TE default metric TLV), a shared risk link group TLV, and a system-ID TLV.

TABLE 5

| General packet format | 0-4 | 5-8 | 9-12 | 13-16 | 17-20 | 21-24 | 25-28 | 29-32 |
|---|---|---|---|---|---|---|---|---|
| Link attribute | Optional non-transitive attribute | Attribute flag | Attribute type | Attribute length | | / | | |
| | | Sub-TLV type = 1028 (IPv4 router-ID of local node) | | | | Length = 4 | | |
| | | IPv4 router-ID | | | | | | |
| | | Sub-TLV type = 1029 (IPv6 router-ID of local node) | | | | Length = 16 | | |
| | | IPv6 router-ID | | | | | | |
| | | Sub-TLV type (administrative group) | | | | Length = 4 | | |
| | | 4-bit to 8-bit mask assigned by the network administrator (4-octet bit mask assigned by the network administrator) | | | | | | |
| | | Sub-TLV type (maximum link bandwidth) | | | | Length = 4 | | |
| | | Maximum available bandwidth of a link | | | | | | |
| | | Sub-TLV type (default cost value of traffic engineering) | | | | Length | | |
| | | Default cost value of traffic engineering | | | | | | |
| | | Sub-TLV type (default cost value of traffic engineering) | | | | Length | | |
| | | Sub-TLV type (shared risk link group) | | | | Length = 4 | | |
| | | Value of shared risk link group | | | | | | |
| | | Sub-TLV type (system-ID) | | | | Length = 4 | | |
| | | system-ID | | | | | | |

The router IPv4 identifier TLV, the router IPv6 identifier TLV, and the system-ID TLV are examples of the node identifier TLV. The router IPv4 identifier TLV, the router IPv6 identifier TLV, and the system-ID TLV respectively carry an IPv4 router-ID, an IPv6 router-ID, and a system-ID. TLVs other than the node identifier TLV in Table 5 carry link information. In addition, for features that are the same in Table 5 and Table 4, refer to the foregoing description of Table 4. Details are not described herein again.

The foregoing method 200 is described below by using examples with reference to four instances. The PE 3 and the ASBR 3 in the following four instances are examples for describing the first network device in the method 200. The node identifier of the ASBR 3 in the following four instances is an example for describing the node identifier in the method 200.

Instance 1: A BGP router-ID is used as an association field between an intra-domain link and an inter-domain link.

Figure 3:
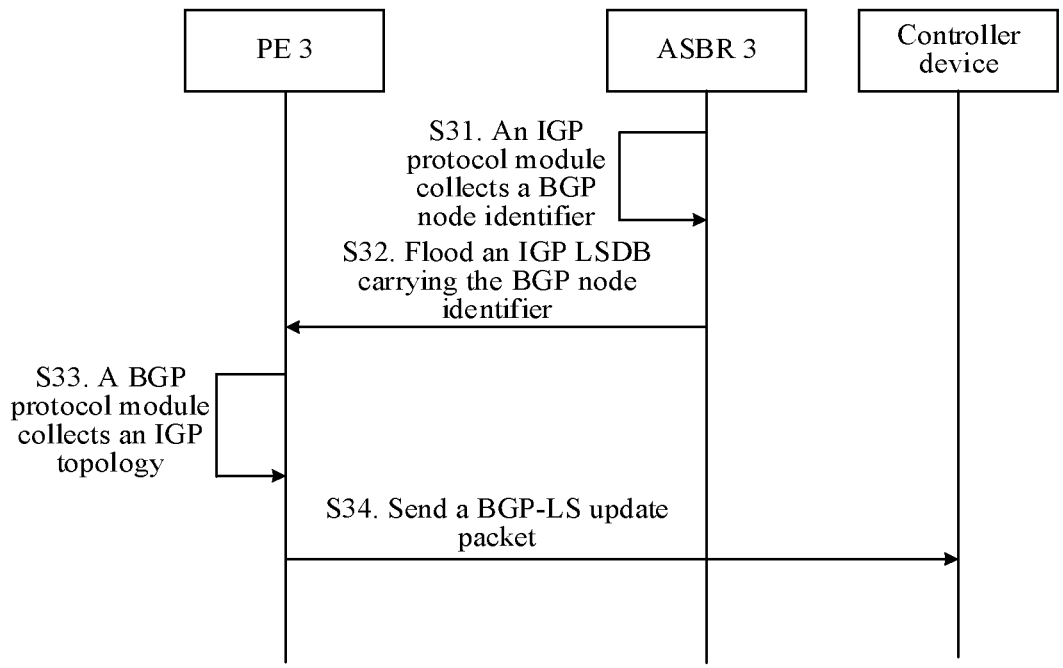
FIG. 3 is a flowchart of a method for advertising topology information according to an embodiment of this application.
Figure 4:
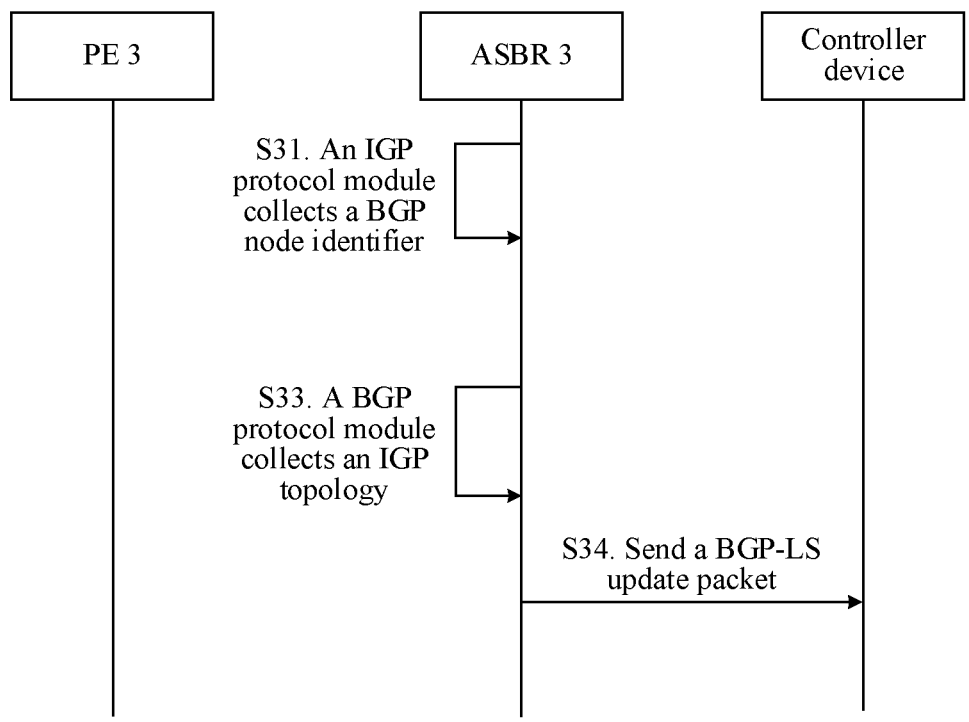
FIG. 4 is a flowchart of a method for advertising topology information according to an embodiment of this application.

Instance 1 is described by using an example in which the PE 3, the ASBR 3, and the controller device in FIG. 1 interact with each other. Referring to FIG. 3 and FIG. 4, FIG. 3 and FIG. 4 are both flowcharts of Instance 1. A difference between the procedure shown in FIG. 3 and the procedure shown in FIG. 4 is that the procedure shown in FIG. 3 is applicable to a networking architecture in which the controller device and the PE 3 are BGP-LS neighbors, and the procedure shown in FIG. 4 is applicable to a networking architecture in which the controller device and the ASBR 3 are BGP-LS neighbors. Instance 1 includes the following step S31 to step S34.

Step S31: An IGP protocol module in the ASBR 3 collects a BGP router-ID of the ASBR 3 from a BGP protocol module in the ASBR 3.

Step S32: When flooding an LSDB to a neighbor (PE 3), the IGP protocol module in the ASBR 3 floods the collected BGP router-ID of the ASBR 3 to the neighbor (PE 3). The BGP router-ID can be transmitted via an IGP packet such as LSA. After the PE 3 receives the BGP router-ID of the ASBR 3, the PE 3 stores the BGP router-ID of the ASBR 3 in the LSDB. A TLV newly added in the IGP packet flooded based on the IGP carries the BGP router-ID of the ASBR 3. A format of the newly added TLV is shown in Table 1.

Step S33: As shown in FIG. 3, a BGP-LS protocol module in the PE 3 collects topology information from an IGP protocol module in the PE 3. The IGP protocol module of the PE 3 reports the BGP router-ID of the ASBR 3 as node information to the BGP-LS protocol module of the PE 3. Alternatively, as shown in FIG. 4, the BGP-LS protocol module in the ASBR 3 collects topology information from the IGP protocol module in the ASBR 3. The IGP protocol module in the ASBR 3 reports the BGP router-ID of the ASBR 3 as node information to the BGP-LS protocol module in the ASBR 3.

Step S34: As shown in FIG. 3, after the BGP-LS protocol module in the PE 3 collects IGP topology information (intra-domain topology information), the PE 3 encapsulates the IGP topology information into a BGP-LS update packet, and the PE 3 advertises the BGP-LS update packet to the controller device through the BGP-LS neighbors. A BGP-LS node route attribute carries the BGP router-ID. For example, the TLV shown in Table 1 is newly added.

Alternatively, as shown in FIG. 4, after the BGP-LS protocol module in the ASBR 3 collects IGP topology information, the ASBR 3 encapsulates the IGP topology information into a BGP-LS update packet, and the ASBR 3 advertises the BGP-LS update packet to the controller device through the BGP-LS neighbors. A BGP-LS node route attribute carries the BGP router-ID. For example, the TLV shown in Table 1 is newly added.

In Instance 1, the IGP topology information collected by the controller device based on BGP-LS includes the BGP router-ID of the ASBR 3. Inter-domain link information collected by the controller device based on BGP-LS also includes the BGP router-ID of the ASBR 3. The controller device may associate an intra-domain topology with an inter-domain topology based on the BGP router-ID of the ASBR 3.

Instance 2: Global device information is reported for splicing of an inter-domain link and an intra-domain link.

Figure 5:
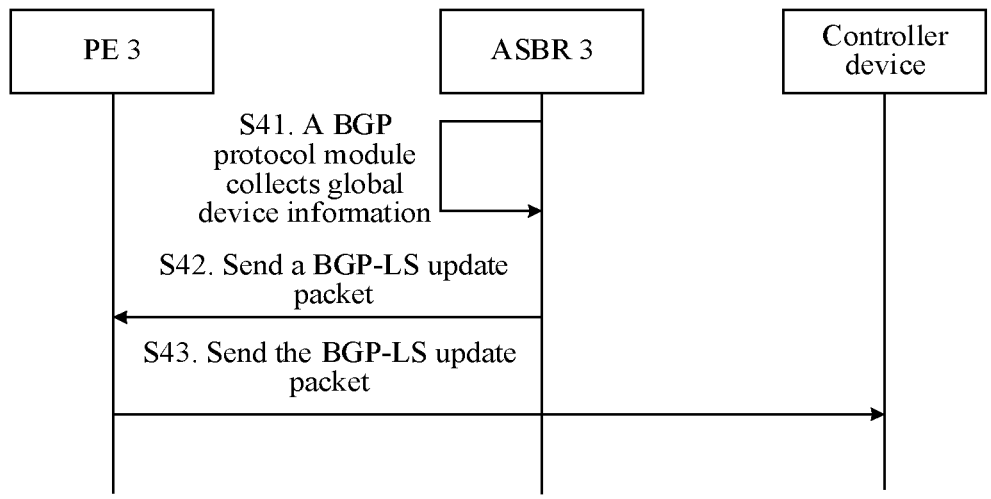
FIG. 5 is a flowchart of a method for advertising topology information according to an embodiment of this application.
Figure 6:
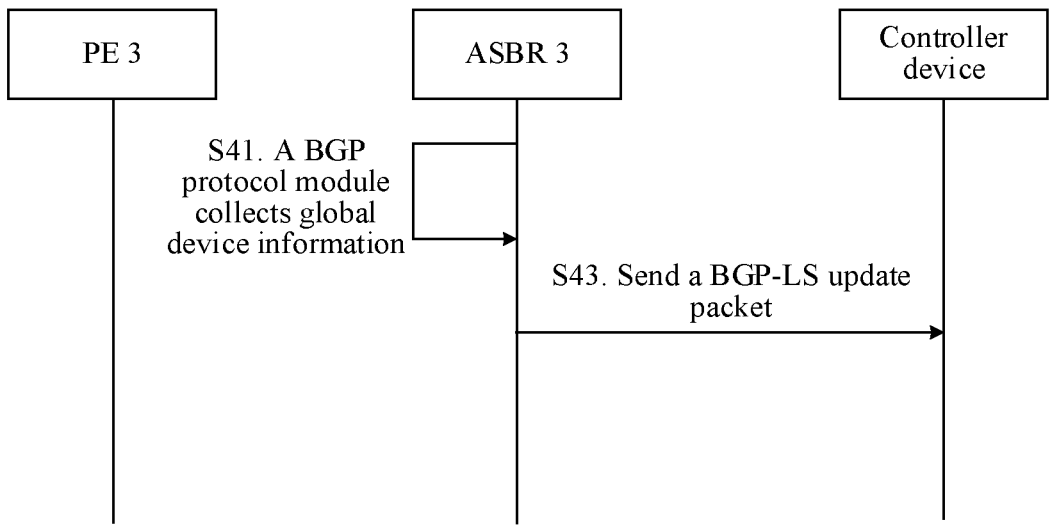
FIG. 6 is a flowchart of a method for advertising topology information according to an embodiment of this application.

Instance 2 is described by using an example in which the PE 3, the ASBR 3, and the controller device in FIG. 1 interact with each other. Referring to FIG. 5 and FIG. 6, FIG. 5 and FIG. 6 are both flowcharts of Instance 2. A difference between the procedure shown in FIG. 5 and the procedure shown in FIG. 6 is that the procedure shown in FIG. 5 is applicable to a networking architecture in which the controller device and the PE 3 are BGP-LS neighbors, and the procedure shown in FIG. 6 is applicable to a networking architecture in which the controller device and the ASBR 3 are BGP-LS neighbors. Instance 2 includes the following step S41 to step S43.

Step S41: A BGP-LS protocol module in the ASBR 3 collects global device information of the ASBR 3. For example, the global device information includes a BGP router-ID, a TE router-ID, a system-ID, and the like.

Step S42: The BGP-LS protocol module in the ASBR 3 encapsulates the collected global device information of the ASBR 3 into a BGP-LS update packet (a new route type), and advertises the BGP-LS update packet to a neighbor (PE 3).

Step S43: As shown in FIG. 5, a BGP-LS protocol module in the PE 3 encapsulates the collected global device information of the ASBR 3 into a BGP-LS update packet (a newly added route type), and advertises the BGP-LS update packet to the controller device. Alternatively, as shown in FIG. 6, the BGP-LS protocol module in the ASBR 3 encapsulates the collected global device information of the ASBR 3 into a BGP-LS update packet (a newly added route type), and advertises the BGP-LS update packet to the controller device. After collecting the global device information of the ASBR 3 based on BGP-LS, the controller device generates a mapping relationship table (as shown in Table 3) of the global device information.

In Instance 2, when collecting inter-domain link information and intra-domain link information based on the BGP-LS, the controller device may implement link splicing according to the mapping relationship table based on a BGP router-ID of the ASBR 3 in an inter-domain link and a TE router-ID of the ASBR 3 carried in an IPv4 router-ID of local node field of an intra-domain IGP.

Instance 3: An IPv4 local node identifier (IPv4 Router-ID of Local Node) or an IPv6 local node identifier (IPv6 Router-ID of Local Node) is used as an association field between an intra-domain link and an inter-domain link.

Figure 7:
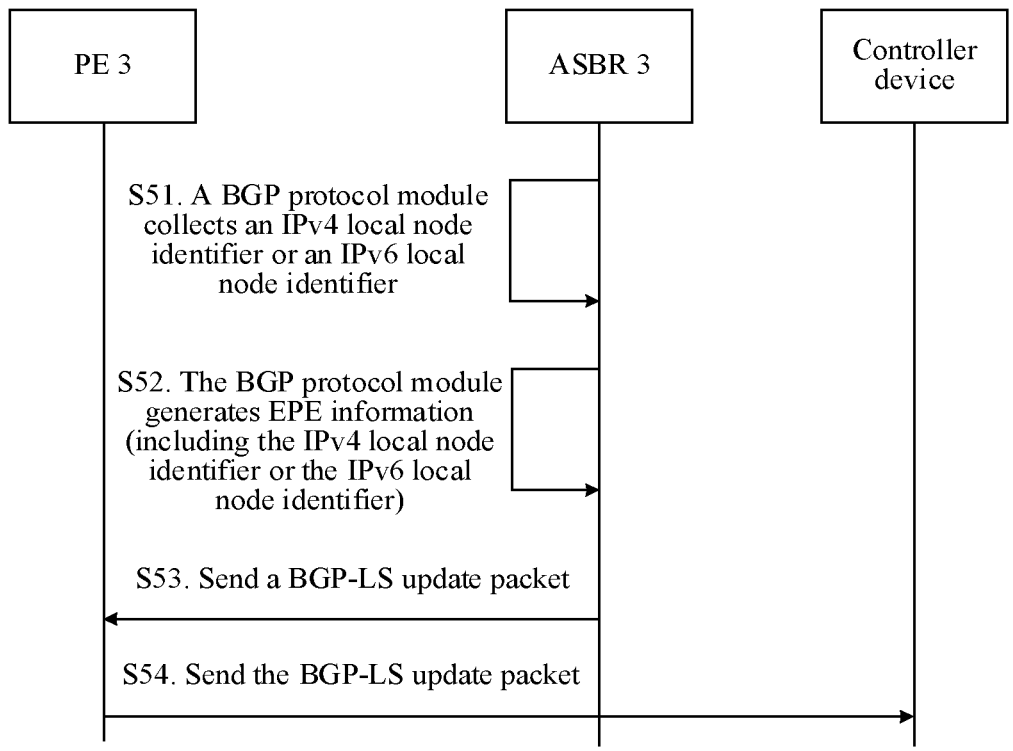
FIG. 7 is a flowchart of a method for advertising topology information according to an embodiment of this application.
Figure 8:
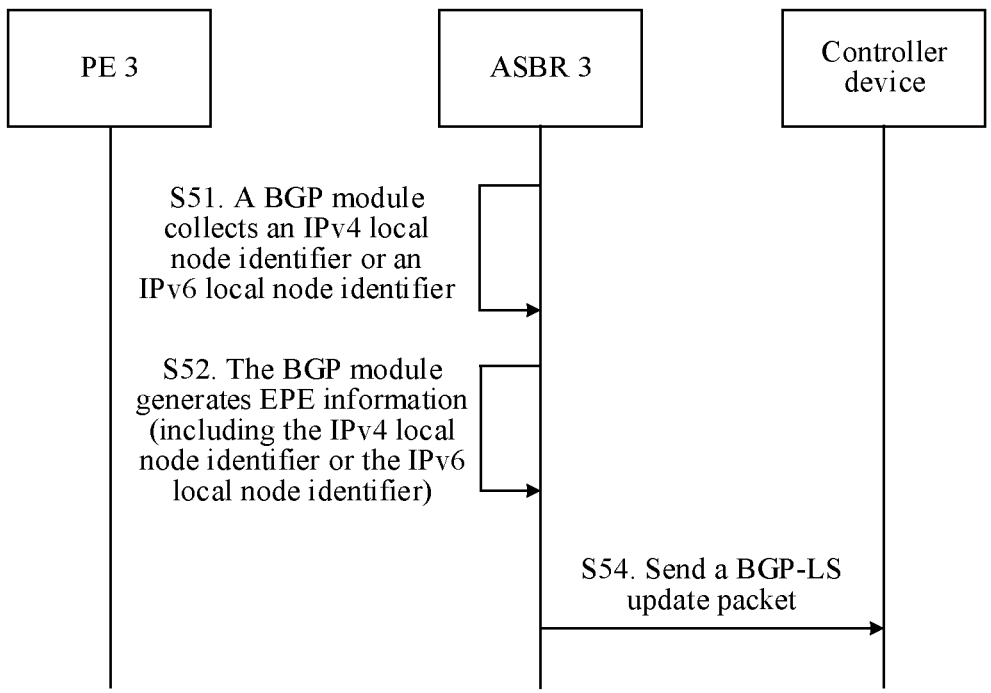
FIG. 8 is a flowchart of a method for advertising topology information according to an embodiment of this application.

Instance 3 is described by using an example in which the PE 3, the ASBR 3, and the controller device in FIG. 1 interact with each other. Referring to FIG. 7 and FIG. 8, FIG. 7 and FIG. 8 are both flowcharts of Instance 3. A difference between the procedure shown in FIG. 7 and the procedure shown in FIG. 8 is that the procedure shown in FIG. 7 is applicable to a networking architecture in which the controller device and the PE 3 are BGP-LS neighbors, and the procedure shown in FIG. 8 is applicable to a networking architecture in which the controller device and the ASBR 3 are BGP-LS neighbors. Instance 3 includes the following step S51 to step S54.

Step S51: A BGP-LS protocol module in the ASBR 3 collects an IPv4 local node identifier or an IPv6 local node identifier of the ASBR 3 from an IGP protocol module.

Step S52: The BGP-LS protocol module in the ASBR 3 encapsulates the collected IPv4 local node identifier or IPv6 local node identifier of the ASBR 3 into an EPE BGP-LS update packet attribute, and generates EPE routing information. The IPv4 local node identifier is carried in the IPv4 router-ID of local node (type1028), and the IPv6 local node identifier is carried in the IPv6 router-ID of local node (type1029).

Step S53: As shown in FIG. 7, the BGP-LS protocol module in the ASBR 3 advertises a BGP-LS EPE route to the PE 3. The BGP-LS EPE route includes the IPv4 local node identifier or IPv6 local node identifier in the ASBR 3.

Step S54: As shown in FIG. 7, a BGP-LS protocol module in the PE 3 advertises the BGP-LS EPE route including the IPv4 local node identifier or IPv6 local node identifier of the ASBR 3 to the controller device. Alternatively, as shown in FIG. 8, the BGP-LS protocol module in the ASBR 3 advertises a BGP-LS EPE route including the IPv4 local node identifier or IPv6 local node identifier of the ASBR 3 to the controller device.

In Instance 3, inter-domain topology information collected by the controller device based on BGP-LS includes the IPv4 local node identifier or IPv6 local node identifier of the ASBR 3. In an example, the IPv4 router-ID of local node (type1028) in the BGP-LS packet carries the IPv4 local node identifier of the ASBR 3; or the IPv6 router-ID of local node (type1029) in the BGP-LS packet carries the IPv6 local node identifier of the ASBR 3. In addition, intra-domain link information collected by the controller device based on BGP-LS also includes the IPv4 local node identifier or IPv6 local node identifier of the ASBR 3. The controller device may associate an intra-domain topology with an inter-domain topology based on the IPv4 local node identifier or IPv6 local node identifier of the ASBR 3.

Instance 4: A device identifier is used as an association field between an intra-domain link and an inter-domain link.

Figure 9:
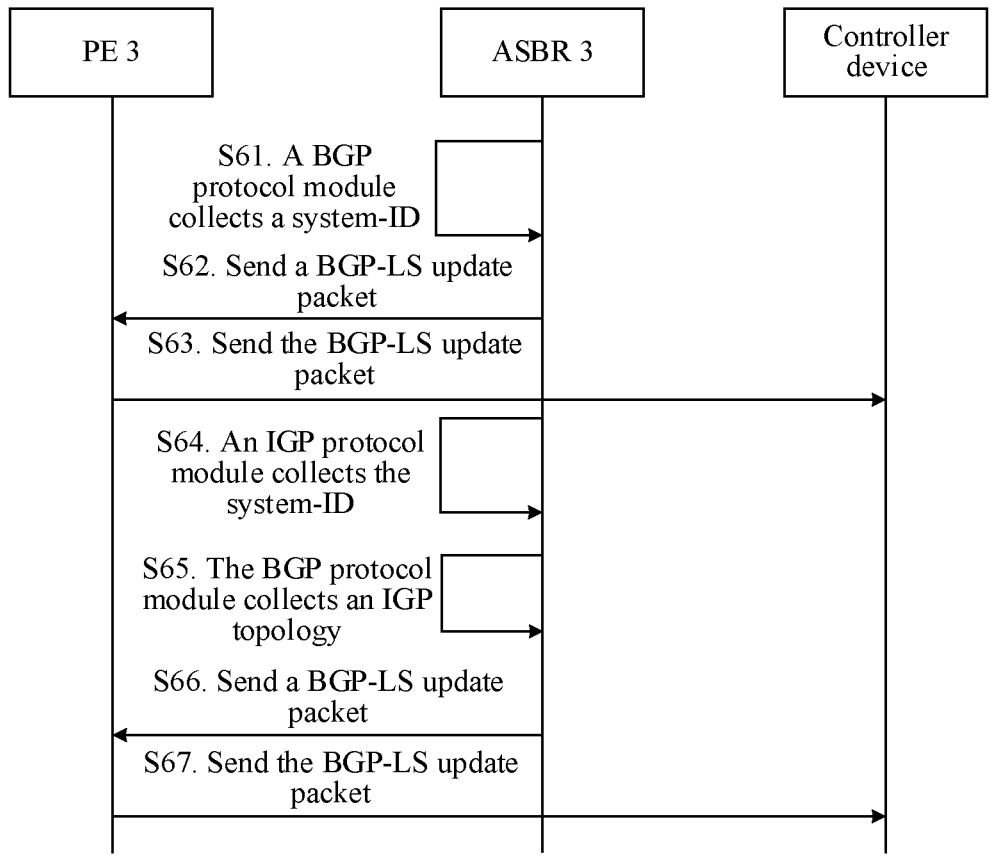
FIG. 9 is a flowchart of a method for advertising topology information according to an embodiment of this application.
Figure 10:
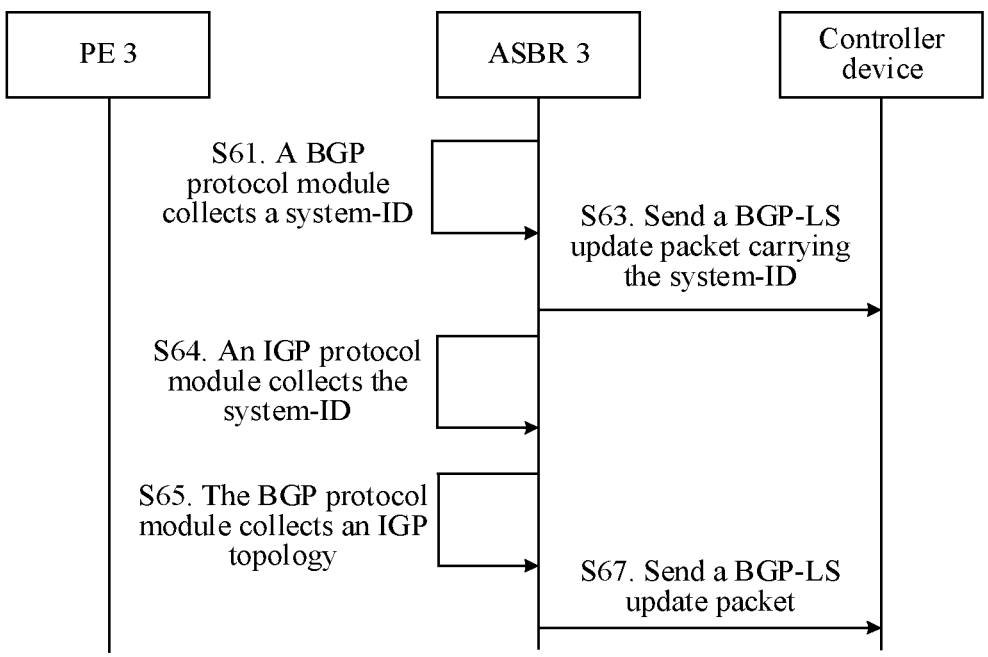
FIG. 10 is a flowchart of a method for advertising topology information according to an embodiment of this application.

Instance 4 is described by using an example in which the PE 3, the ASBR 3, and the controller device in FIG. 1 interact with each other. Referring to FIG. 9 and FIG. 10, FIG. 9 and FIG. 10 are both flowcharts of Instance 4. A difference between the procedure shown in FIG. 9 and the procedure shown in FIG. 10 is that the procedure shown in FIG. 9 is applicable to a networking architecture in which the controller device and the PE 3 are BGP-LS neighbors, and the procedure shown in FIG. 10 is applicable to a networking architecture in which the controller device and the ASBR 3 are BGP-LS neighbors. Instance 4 includes the following step S61 to step S67.

Step S61: A BGP protocol module in the ASBR 3 collects a system-ID of the ASBR 3.

Step S62: As shown in FIG. 9, when generating a BGP-LS EPE route, the BGP protocol module in the ASBR 3 includes the system-ID of the ASBR 3 as a newly added attribute in a route attribute, and advertises the route attribute to a neighbor device PE 3. For example, the system-ID is carried by the TLV shown in Table 2.

Step S63: As shown in FIG. 9, the PE 3 advertises EPE routing information including the system-ID of the ASBR 3 to the controller device through the BGP-LS neighbors. Alternatively, as shown in FIG. 10, the ASBR 3 advertises EPE routing information including the system-ID of the ASBR 3 to the controller device through the BGP-LS neighbors.

Step S64: An IGP protocol module in the ASBR 3 collects the system-ID of the ASBR 3.

Step S65: The BGP-LS protocol module in the ASBR 3 collects topology information from the IGP protocol module in the ASBR 3. The IGP protocol module in the ASBR 3 reports the system-ID as a new topology attribute to the BGP-LS protocol module of the ASBR 3. The BGP-LS protocol module encapsulates the topology information (the newly added system-ID) into a BGP-LS update packet. For example, the system-ID is carried by the TLV shown in Table 2.

Step S66: The ASBR 3 advertises the BGP-LS update packet (intra-domain topology information) generated based on the BGP-LS to the PE 3 through the BGP-LS neighbors.

Step S67: As shown in FIG. 9, the PE 3 advertises a BGP-LS update packet (intra-domain topology information) generated based on the BGP-LS to the controller device through the BGP-LS neighbors. Alternatively, as shown in FIG. 10, the ASBR 3 advertises a BGP-LS update packet (intra-domain topology information) generated based on the BGP-LS to the controller device through the BGP-LS neighbors.

In Instance 4, inter-domain topology information collected by the controller device based on BGP-LS includes the system-ID of the ASBR 3. Intra-domain link information collected by the controller device based on BGP-LS also includes the system-ID of the ASBR 3. The controller device may associate an intra-domain topology with an inter-domain topology based on the system-ID of the ASBR 3.

The foregoing describes the method embodiments in embodiments of this application. The following describes a network device and a controller device in embodiments of this application.

Figure 11:
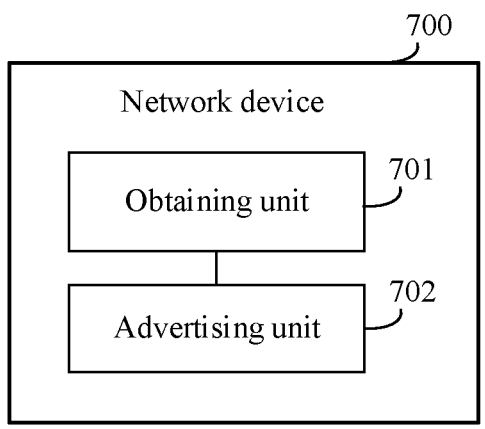
FIG. 11 is a schematic diagram of a structure of a network device 700 according to an embodiment of this application.

FIG. 11 is a schematic diagram of a possible structure of the first network device involved in the foregoing embodiments. A network device 700 shown in FIG. 11 implements functions of, for example, the first network device in the method 200, the ASBR 3 in Instance 1 to Instance 4, or the PE 3 in Instance 1 to Instance 4.

Referring to FIG. 11, the network device 700 includes an obtaining unit 701 and an advertising unit 702. All or some of the units in the network device 700 are implemented by software, hardware, firmware, or any combination thereof. Each unit in the network device 700 is configured to implement a corresponding function of the first network device, the PE 3, or the ASBR 3. For example, the obtaining unit 701 is configured to support the network device 700 in performing S210. The advertising unit 702 is configured to support the network device 700 in performing S220. In another example, the obtaining unit 701 is configured to support the network device 700 in performing S33. The advertising unit 702 is configured to support the network device 700 in performing S34. In another example, the obtaining unit 701 is configured to support the network device 700 in performing S41. The advertising unit 702 is configured to support the network device 700 in performing S43. In another example, the obtaining unit 701 is configured to support the network device 700 in performing S51 and S52. The advertising unit 702 is configured to support the network device 700 in performing S54. In another example, the obtaining unit 701 is configured to support the network device 700 in performing S61, S63, S64, and S66. The advertising unit 702 is configured to support the network device 700 in performing S63 and S67.

In some embodiments, the network device 700 further includes a processing unit. The processing unit is configured to support the network device 700 in performing steps related to generating a BGP-LS packet in the method 200 and Instance 1 to Instance 4.

In some embodiments, the network device 700 further includes a receiving unit. The receiving unit is configured to support the network device 700 in performing steps related to receiving a node identifier, an IGP packet, and a BGP-LS packet in the method 200 and Instance 1 to Instance 4.

For an execution process of the network device 700, refer to the detailed descriptions of corresponding steps in the method 200 and Instance 1 to Instance 4. Details are not described herein again.

In embodiments of this application, the unit division is an example, and is merely logical function division. During actual implementation, another division manner may be optionally used.

In some embodiments, the units in the network device 700 are integrated into one unit. For example, the units in the network device 700 are integrated into a same chip. The chip includes a processing circuit, and an input interface and an output interface that are internally connected to and communicate with the processing circuit. The obtaining unit 701 is implemented through the processing circuit in the chip. The receiving unit in the network device 700 is implemented through the input interface in the chip. The advertising unit 702 is implemented through the output interface in the chip. For example, the chip is implemented through one or more field-programmable gate arrays (FPGA), a programmable logic device (PLD), a controller, a state machine, gate logic, a discrete hardware component, any other suitable circuit, or any combination of circuits that can implement various functions described in this application.

In some other embodiments, each unit of the network device 700 exists independently physically. In some other embodiments, some units of the network device 700 exist independently physically, and the other units are integrated into one unit. For example, in some embodiments, the obtaining unit 701 and the advertising unit 702 are a same unit. In some other embodiments, the obtaining unit 701 and the advertising unit 702 are different units. In some embodiments, integration of different units is implemented in a form of hardware, that is, different units correspond to same hardware. In another example, integration of different units is implemented in a form of a software unit.

When the network device 700 is implemented by hardware, the obtaining unit 701, the processing unit, and the like in the network device 700 are implemented, for example, by a central processing unit 1011 on a main control board 1010 in a device 1000, or in another example, by a processor 1101 in a device 1100. The advertising unit 702, the receiving unit, and the like in the network device 700 are implemented by, for example, an interface board 1030 in the device 1000, or a communication interface 1104 in the device 1100.

When the network device 700 is implemented by software, each unit in the network device 700 is, for example, software generated after the central processing unit 1011 on the main control board 1010 in the device 1000 reads program code stored in a memory 1012 on the main control board 1010, or is, for example, software generated after the processor 1101 in the device 1100 reads program code stored in a memory 1103.

For example, the network device 700 is a virtualization device. The virtualization device includes but is not limited to at least one of a virtual machine, a container, and a pod. In some embodiments, the network device 700 is deployed, in a form of a virtual machine, on a hardware device (for example, a physical server). For example, the network device 700 is implemented based on a general-purpose physical server in combination with a network functions virtualization (NFV) technology. When a virtual machine is used for implementation, the network device 700 is, for example, a virtual host, a virtual router, or a virtual switch. After reading this application, a person skilled in the art may virtualize the network device 700 on the general-purpose physical server with reference to the NFV technology. In some other embodiments, the network device 700 is deployed on a hardware device in a form of a container (for example, a docker container). For example, the procedure of the foregoing method embodiments performed by the network device 700 is encapsulated in an image file, and the hardware device runs the image file to create the network device 700. In some other embodiments, the network device 700 is deployed on a hardware device in a form of a pod. The pod includes a plurality of containers, and each container is configured to implement one or more units in the network device 700.

Figure 12:
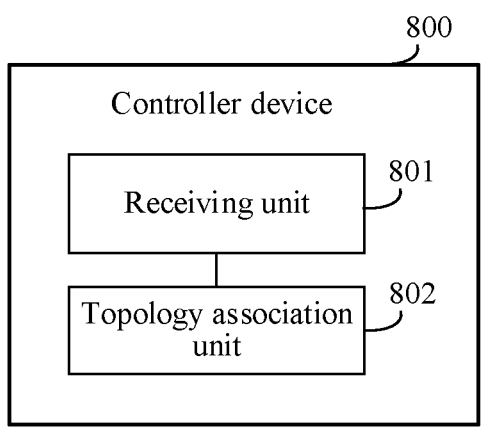
FIG. 12 is a schematic diagram of a structure of a controller device 800 according to an embodiment of this application.

FIG. 12 is a schematic diagram of a possible structure of the controller device involved in the foregoing embodiments. A controller device 800 shown in FIG. 12 implements functions of, for example, the controller device in the method 200 and Instance 1 to Instance 4.

Referring to FIG. 12, the controller device 800 includes a receiving unit 801 and a topology association unit 802. All or some of the units in the controller device 800 are implemented by software, hardware, firmware, or any combination thereof. Each unit in the controller device 800 is configured to implement a corresponding function of the controller device in the method 200 and Instance 1 to Instance 4. For example, the receiving unit 801 is configured to support the controller device 800 in performing steps of receiving a BGP-LS update packet in S230 and Instance 1 to Instance 4. The topology association unit 802 is configured to support the controller device 800 in performing steps related to associating an intra-domain topology with an inter-domain topology in S240 and Instance 1 to Instance 4. For an execution process of the controller device 800, refer to the detailed descriptions of corresponding steps in the method 200 and Instance 1 to Instance 4. Details are not described herein again.

In embodiments of this application, the unit division is an example, and is merely logical function division. During actual implementation, another division manner may be optionally used.

In some embodiments, the units in the controller device 800 are integrated into one unit. For example, the units in the controller device 800 are integrated into a same chip. The chip includes a processing circuit, and an input interface and an output interface that are internally connected to and communicate with the processing circuit. The topology association unit 802 is implemented through the processing circuit in the chip. The receiving unit 801 is implemented through the input interface in the chip. For example, the chip is implemented through one or more FPGAs, a PLD, a controller, a state machine, gate logic, a discrete hardware component, any other suitable circuit, or any combination of circuits that can implement various functions described in this application.

In some other embodiments, each unit of the controller device 800 exists independently physically. In some other embodiments, some units of the controller device 800 exist independently physically, and the other units are integrated into one unit. For example, in some embodiments, the receiving unit 801 and the topology association unit 802 are a same unit. In some other embodiments, the receiving unit 801 and the topology association unit 802 are different units. In some embodiments, integration of different units is implemented in a form of hardware, that is, different units correspond to same hardware. In another example, integration of different units is implemented in a form of a software unit.

When the controller device 800 is implemented by hardware, the topology association unit 802 in the controller device 800 is implemented, for example, by a central processing unit 1011 on a main control board 1010 in a device 1000, or in another example, by a processor 1101 in a device 1100. The receiving unit 801, a sending unit, and the like in the controller device 800 are implemented by, for example, an interface board 1030 in the device 1000, or a communication interface 1104 in the device 1100.

When the controller device 800 is implemented by software, each unit in the controller device 800 is, for example, software generated after the central processing unit 1011 on the main control board 1010 in the device 1000 reads program code stored in a memory 1012 on the main control board 1010, or is, for example, software generated after the processor 1101 in the device 1100 reads program code stored in a memory 1103. For example, the controller device 800 is a virtualization device. The virtualization device includes but is not limited to at least one of a virtual machine, a container, and a pod. In some embodiments, the controller device 800 is deployed, in a form of a virtual machine, on a hardware device (for example, a physical server). For example, the controller device 800 is implemented based on a general-purpose physical server in combination with an NFV technology. When a virtual machine is used for implementation, the controller device 800 is, for example, a virtual host, a virtual router, or a virtual switch. After reading this application, a person skilled in the art may virtualize the controller device 800 on the general-purpose physical server with reference to the NFV technology. In some other embodiments, the controller device 800 is deployed on a hardware device in a form of a container (for example, a docker container). For example, the procedure of the foregoing method embodiments performed by the controller device 800 is encapsulated in an image file, and the hardware device runs the image file to create the controller device 800. In some other embodiments, the controller device 800 is deployed on a hardware device in a form of a pod. The pod includes a plurality of containers, and each container is configured to implement one or more units in the controller device 800.

Figure 13:
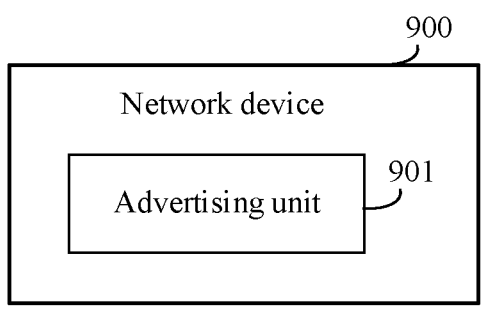
FIG. 13 is a schematic diagram of a structure of a network device 900 according to an embodiment of this application.

FIG. 13 is a schematic diagram of a possible structure of the second network device involved in the foregoing embodiments. A network device 900 shown in FIG. 13 implements functions of, for example, the second network device in the method 200 and Instance 1 to Instance 4, or the network device 900 implements functions of the ASBR 3 in Instance 1 to Instance 4.

Referring to FIG. 13, the network device 900 includes an advertising unit 901. All or part of the advertising unit 901 is implemented by software, hardware, firmware, or any combination thereof. The advertising unit 901 is configured to support the network device 900 in advertising a node identifier. For example, the advertising unit 901 is configured to perform steps of sending a node identifier in the method 200, S32 in Instance 1, S42 in Instance 2, S53 in Instance 3, and S62 in Instance 4.

In some embodiments, the network device 900 further includes a processing unit. The processing unit is configured to support the network device 900 in performing steps related to generating an IGP packet or a BGP-LS packet in the method 200 and Instance 1 to Instance 4.

When the network device 900 is implemented by hardware, the advertising unit 901 in the network device 900 is implemented, for example, by an interface board 1030 in a device 1000, or in another example, through a communication interface 1104 in a device 1100. The processing unit in the network device 900 is implemented, for example, by a central processing unit 1011 on a main control board 1010 in the device 1000, or in another example, by a processor 1101 in the device 1100.

When the network device 900 is implemented by software, each unit in the network device 900 is, for example, software generated after the central processing unit 1011 on the main control board 1010 in the device 1000 reads program code stored in a memory 1012 on the main control board 1010, or is, for example, software generated after the processor 1101 in the device 1100 reads program code stored in a memory 1103. For example, the network device 900 is a virtualization device. The virtualization device includes but is not limited to at least one of a virtual machine, a container, and a pod. In some embodiments, the network device 900 is deployed, in a form of a virtual machine, on a hardware device (for example, a physical server). For example, the network device 900 is implemented based on a general-purpose physical server in combination with an NFV technology. When a virtual machine is used for implementation, the network device 900 is, for example, a virtual host, a virtual router, or a virtual switch. After reading this application, a person skilled in the art may virtualize the network device 900 on the general-purpose physical server with reference to the NFV technology. In some other embodiments, the network device 900 is deployed on a hardware device in a form of a container (for example, a docker container). For example, the procedure of the foregoing method embodiments performed by the network device 900 is encapsulated in an image file, and the hardware device runs the image file to create the network device 900. In some other embodiments, the network device 900 is deployed on a hardware device in a form of a pod. The pod includes a plurality of containers, and each container is configured to implement one or more units in the network device 900.

The foregoing describes, through the network device 700, the controller device 800, and the network device 900, how to implement the first network device, the second network device, or the controller device in the method 200, and the ASBR 3, the PE 3, or the controller device in Instance 1 to Instance 4 from a perspective of logical functions. The following describes, through the device 1000 and the device 1100, how to implement the first network device, the second network device, and the controller device from a perspective of hardware. The device 1000 shown in FIG. 10 and the device 1100 shown in FIG. 11 are examples of hardware structures of the first network device, the second network device, or the controller device in the method 200, and the ASBR 3, the PE 3, or the controller device in Instance 1 to Instance 4.

The device 1000 or the device 1100 corresponds to the first network device, the second network device, or the controller device in the method 200, or the ASBR 3, the PE 3, or the controller device in Instance 1 to Instance 4. Hardware and modules in the device 1000 or the device 1100 and the foregoing other operations and/or functions are respectively used to implement steps and methods implemented by the first network device, the second network device, or the controller device in the method 200, or the ASBR 3, the PE 3, or the controller device in Instance 1 to Instance 4. For a detailed procedure of how the device 1000 or the device 1100 advertises topology information or associates an intra-domain topology with an inter-domain topology, refer to the method 200 and Instance 1 to Instance 4. For brevity, details are not described herein again. The steps in the method 200 and Instance 1 to Instance 4 are completed by using an integrated logic circuit of hardware in the processor of the device 1000 or the device 1100, or by using instructions in a form of software. The steps of the method disclosed with reference to embodiments of this application may be directly performed by a hardware processor, or may be performed by a combination of hardware in the processor and a software module. The software module is located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor. To avoid repetition, details are not described herein again.

Figure 14:
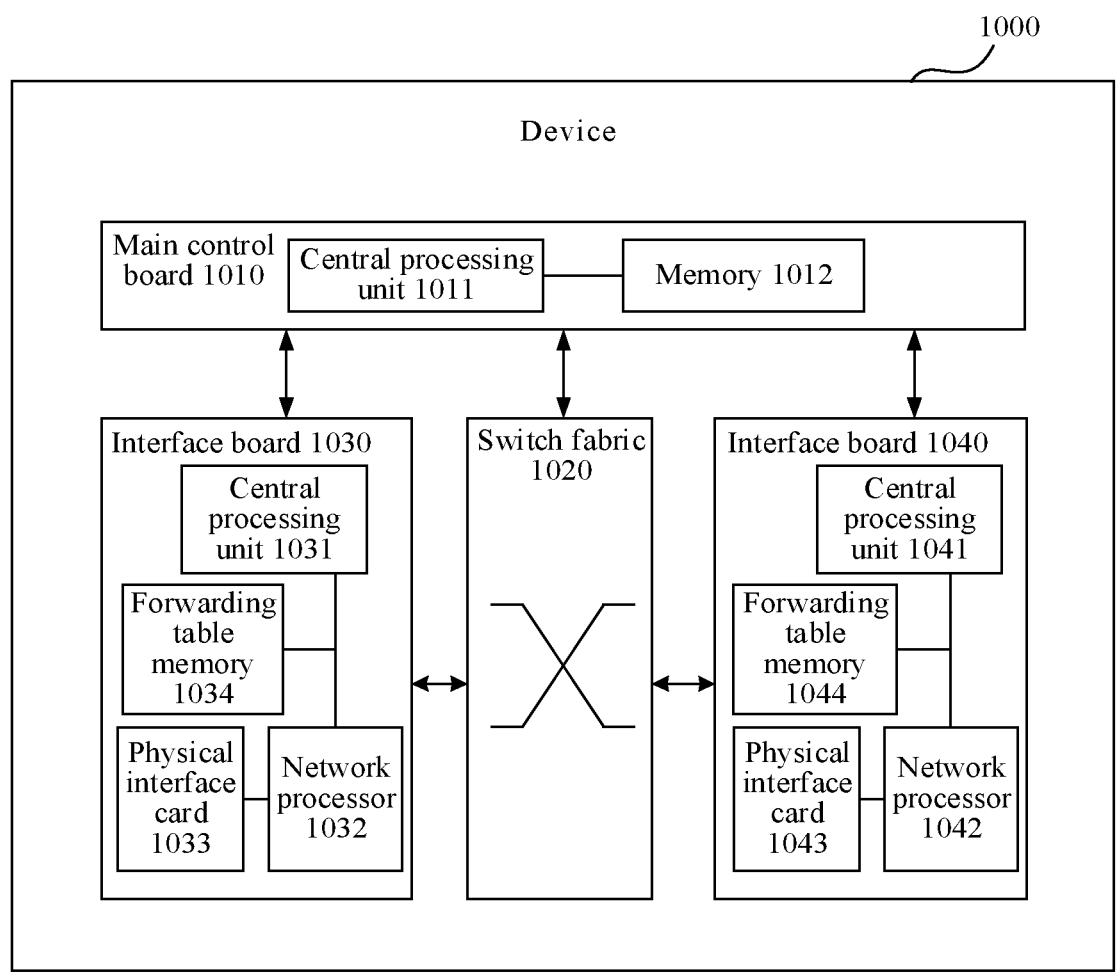
FIG. 14 is a schematic diagram of a structure of a device 1000 according to an embodiment of this application.

Referring to FIG. 14, FIG. 14 is a schematic diagram of a structure of a device 1000 according to an example embodiment of this application. For example, the device 1000 is configured as the first network device, the second network device, or the controller device in the method 200, or the ASBR 3, the PE 3, or the controller device in Instance 1 to Instance 4.

A main control board is also referred to as a main processing unit (LPU) or a route processor card. The main control board 1010 is configured to control and manage components in the device 1000, including functions of route computation, device management, device maintenance, and protocol processing. The main control board 1010 includes a central processing unit 1011 and a memory 1012.

An interface board 1030 is also referred to as a line processing unit (LPU) card, a line card, or a service board. The interface board 1030 is configured to provide various service interfaces and forward a data packet. The service interfaces include but are not limited to an Ethernet interface, a Packet over SONET/SDH (POS) interface, and the like. The Ethernet interface is, for example, a Flexible Ethernet (FlexE) service interface (FlexE Clients). The interface board 1030 includes a central processing unit 1031, a network processor 1032, a forwarding table memory 1034, and a physical interface card (PIC) 1033.

The central processing unit 1031 on the interface board 1030 is configured to control and manage the interface board 1030, and communicate with the central processing unit 1011 on the main control board 1010.

The network processor 1032 is configured to forward a packet. A form of the network processor 1032 is, for example, a forwarding chip. In an example, the network processor 1032 is configured to forward a received packet based on a forwarding table stored in the forwarding table memory 1034. If a destination address of the packet is an address of the device 1000, the packet is sent to a central processing unit (CPU) (for example, the central processing unit 1011) for processing. If a destination address of the packet is not an address of the device 1000, the forwarding table is looked up, based on the destination address, for a next hop and an outbound interface corresponding to the destination address, and the packet is forwarded to the outbound interface corresponding to the destination address. Processing on an uplink packet includes processing on a packet inbound interface and forwarding table lookup. Processing on a downlink packet includes forwarding table lookup and the like.

The physical interface card 1033 is configured to implement a physical layer interconnection function. Original traffic enters the interface board 1030 from the physical interface card 1033, and a processed packet is sent out from the physical interface card 1033. The physical interface card 1033, also referred to as a sub-card, may be mounted on the interface board 1030, and is responsible for converting a photoelectric signal into a packet, performing validity check on the packet, and forwarding the packet to the network processor 1032 for processing. In some embodiments, the central processing unit may alternatively perform a function of the network processor 1032, for example, implement software forwarding based on a general-purpose CPU. Therefore, the network processor 1032 is not necessary in the physical interface card 1033.

Optionally, the device 1000 includes a plurality of interface boards. For example, the device 1000 further includes an interface board 1040, and the interface board 1040 includes a central processing unit 1041, a network processor 1042, a forwarding table memory 1044, and a physical interface card 1043.

Optionally, the device 1000 further includes a switch fabric 1020. The switch fabric 1020 is also referred to as, for example, a switch fabric unit (SFU). When the network device includes a plurality of interface boards 1030, the switch fabric 1020 is configured to complete data exchange among the interface boards. For example, the interface board 1030 and the interface board 1040 communicate with each other through, for example, the switch fabric 1020.

The main control board 1010 is coupled to the interface board 1030. For example, the main control board 1010, the interface board 1030, the interface board 1040, and the switch fabric 1020 are connected to a system backplane through a system bus, to implement interworking. In a possible implementation, an inter-process communication (IPC) channel is established between the main control board 1010 and the interface board 1030, and the main control board 1010 communicates with the interface board 1030 through the IPC channel.

Logically, the device 1000 includes a control plane and a forwarding plane. The control plane includes the main control board 1010 and the central processing unit 1031. The forwarding plane includes components that perform forwarding, such as the forwarding table memory 1034, the physical interface card 1033, and the network processor 1032. The control plane implements functions such as routing, generating a forwarding table, processing signaling and a protocol packet, and configuring and maintaining a device status. The control plane delivers a generated forwarding table to the forwarding plane. On the forwarding plane, based on the forwarding table delivered from the control plane, the network processor 1032 looks up the table and forwards a packet received by the physical interface card 1033. The forwarding table delivered from the control plane is, for example, stored in the forwarding table memory 1034. In some embodiments, the control plane and the forwarding plane are, for example, completely separated, and are not on a same device.

It should be understood that an operation on the interface board 1040 is consistent with an operation on the interface board 1030 in embodiments of this application. For brevity, details are not described again. It should be understood that the device 1000 in the embodiments may correspond to the first network device, the controller device, or the second network device in the foregoing method embodiments. The main control board 1010, the interface board 1030, and/or the interface board 1040 in the device 1000 implement, for example, functions and/or steps implemented by the first network device, the controller device, or the second network device in the foregoing method embodiments. For brevity, details are not described herein again.

It is to be noted that there may be one or more main control boards. When there is a plurality of main control boards, the main control boards may include, for example, an active main control board and a standby main control board. There may be one or more interface boards. A network device having a stronger data processing capability provides more interface boards. There may also be one or more physical interface cards on the interface board. There may be no switch fabric or one or more switch fabrics. When there is a plurality of switch fabrics, load balancing and redundancy backup may be implemented together. In a centralized forwarding architecture, the network device may need no switch fabric, and the interface board provides a function of processing service data in an entire system. In a distributed forwarding architecture, the network device may include at least one switch fabric, and data exchange among a plurality of interface boards is implemented through the switch fabric, to provide a large-capacity data exchange and processing capability. Therefore, a data access and processing capability of a network device in the distributed architecture is better than that of a device in the centralized architecture. Optionally, the network device may be in a form of only one board. In an example, there is no switch fabric, and functions of the interface board and the main control board are integrated on the board. In this case, the central processing unit on the interface board and the central processing unit on the main control board may be combined to form one central processing unit on the board, to implement functions obtained by combining the two central processing units. This form of device (for example, a network device such as a low-end switch or a router) has a low data exchange and processing capability. An architecture that is to be used depends on a networking deployment scenario. This is not limited herein.

Figure 15:
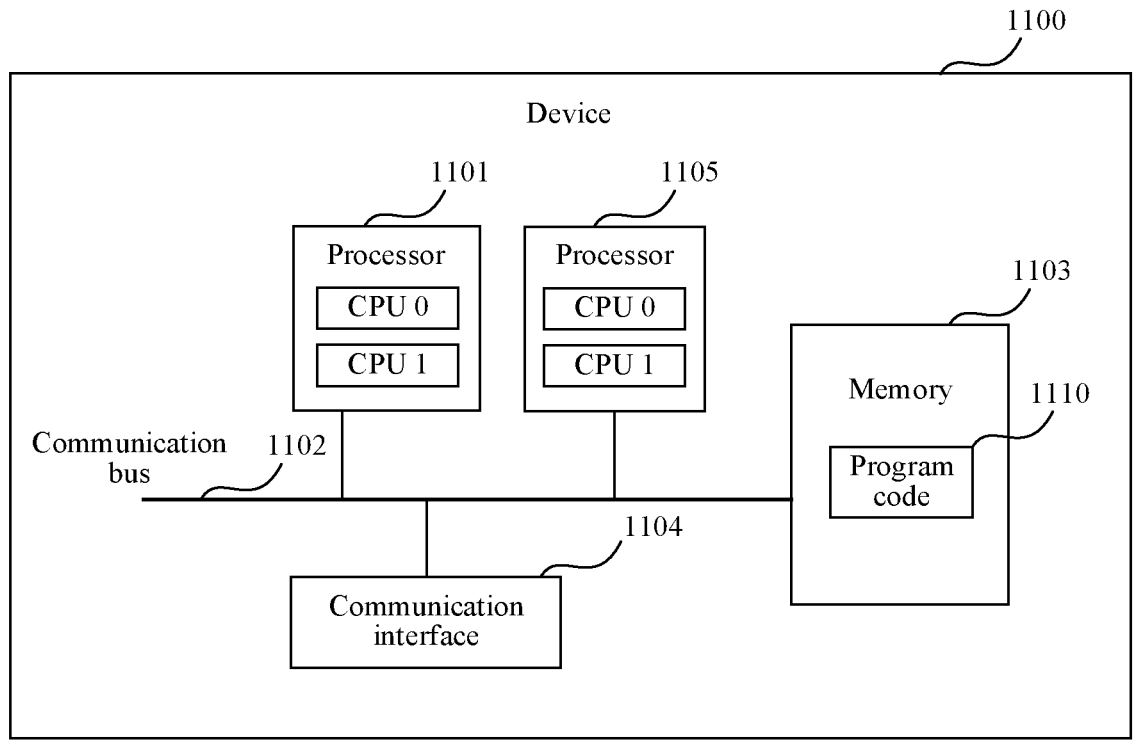
FIG. 15 is a schematic diagram of a structure of a device 1100 according to an embodiment of this application.

Referring to FIG. 15, FIG. 15 is a schematic diagram of a structure of a device 1100 according to an example embodiment of this application. For example, the device 1100 is configured as the first network device, the second network device, or the controller device in the method 200, or the ASBR 3, the PE 3, or the controller device in Instance 1 to Instance 4. The device 1100 may be a host, a server, a personal computer, or the like. The device 1100 may be implemented by using a general bus system structure.

The device 1100 includes at least one processor 1101, a communication bus 1102, a memory 1103, and at least one communication interface 1104.

The processor 1101 is, for example, a general-purpose CPU, a network processor (NP), a graphics processing unit (GPU), a neural-network processing unit (NPU), a data processing unit (DPU), a microprocessor, or one or more integrated circuits configured to implement the solutions of this application. For example, the processor 1101 includes an application-specific integrated circuit (ASIC), a PLD, or a combination thereof. The PLD is, for example, a complex programmable logic device (complex programmable logic device, CPLD), an FPGA, generic array logic (GAL), or any combination thereof.

The communication bus 1102 is configured to transmit information among the foregoing components. The communication bus 1102 may be classified into an address bus, a data bus, a control bus, and the like. For ease of representation, only one bold line is used to represent the bus in FIG. 15, but this does not mean that there is only one bus or only one type of bus.

The memory 1103 is, for example, a read-only memory (ROM) or another type of static storage device that can store static information and instructions, or a random-access memory (RAM) or another type of dynamic storage device that can store information and instructions, or an electrically erasable programmable ROM (EEPROM), a compact disc ROM (CD-ROM) or another compact disc storage, an optical disc storage (including a compact disc, a laser disc, an optical disc, a digital versatile disc, a BLU-RAY disc, and the like), a magnetic disk storage medium or another magnetic storage device, or any other medium that can be configured to carry or store expected program code in a form of instructions or a data structure and that can be accessed by a computer, but is not limited thereto. For example, the memory 1103 exists independently, and is connected to the processor 1101 by the communication bus 1102. The memory 1103 may alternatively be integrated with the processor 1101.

The communication interface 1104 is configured to communicate with another device or communication network by using any apparatus such as a transceiver. The communication interface 1104 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, or a combination thereof.

During implementation, in an embodiment, the processor 1101 may include one or more CPUs, for example, a CPU 0 and a CPU 1 shown in FIG. 15.

During implementation, in an embodiment, the device 1100 may include a plurality of processors, for example, a processor 1101 and a processor 1105 shown in FIG. 15. Each of the processors may be a single-core processor (single-CPU) or a multi-core processor (multi-CPU). The processor herein may be one or more devices, circuits, and/or processing cores configured to process data (for example, computer program instructions).

During implementation, in an embodiment, the device 1100 may further include an output device and an input device. The output device communicates with the processor 1101, and may display information in a plurality of manners. For example, the output device may be a liquid-crystal display (LCD), a light-emitting diode (LED) display device, a cathode-ray tube (CRT) display device, a projector (projector), or the like. The input device communicates with the processor 1101, and may receive an input by a user in a plurality of manners. For example, the input device may be a mouse, a keyboard, a touchscreen device, a sensing device, or the like.

In some embodiments, the memory 1103 is configured to store program code 1110 for executing the solutions of this application, and the processor 1101 may execute the program code 1110 stored in the memory 1103. In other words, the device 1100 may implement, by using the processor 1101 and the program code 1110 in the memory 1103, the methods provided in the method 200 and Instance 1 to Instance 4.

The device 1100 in embodiments of this application may correspond to the first network device, the second network device, or the controller device in the foregoing method 200, and the ASBR 3, the PE 3, or the controller device in Instance 1 to Instance 4. In addition, the processor 1101, the communication interface 1104, and the like in the device 1100 may implement functions and/or steps and methods implemented by the first network device, the second network device, or the controller device in the method 200, and the ASBR 3, the PE 3, or the controller device in Instance 1 to Instance 4. For brevity, details are not described herein again.

Figure 16:
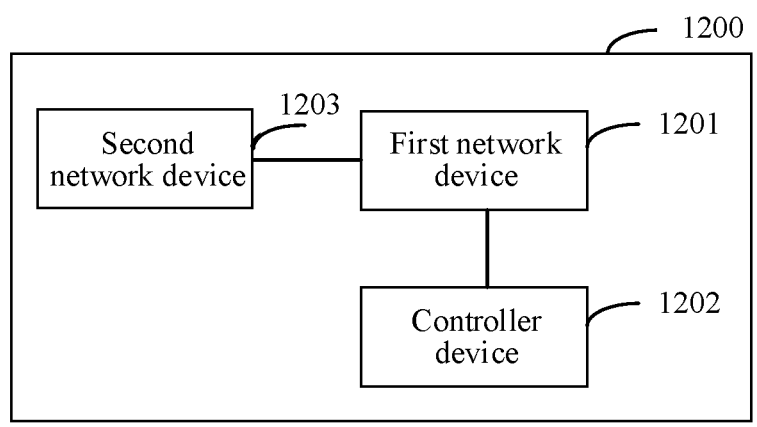
FIG. 16 is a schematic diagram of a structure of a network system 1200 according to an embodiment of this application.

Referring to FIG. 16, an embodiment of this application provides a network system 1200. The network system 1200 includes a first network device 1201, a controller device 1202, and a second network device 1203.

In some embodiments, the first network device 1201 is the network device 700 shown in FIG. 11, the controller device 1202 is the controller device 800 shown in FIG. 16, and the second network device 1203 is the network device 900 shown in FIG. 13.

In some embodiments, at least one of the first network device 1201, the controller device 1202, or the second network device 1203 is the device 1000 shown in FIG. 14 or the device 1100 shown in FIG. 15.

In some embodiments, a computer program product is provided. The computer program product includes computer instructions, and the computer instructions are stored in a computer-readable storage medium. A processor of a network device reads the computer instructions from the computer-readable storage medium, and the processor executes the computer instructions, so that the network device performs the method performed by the first network device in the foregoing method embodiments.

In some embodiments, a computer program product is provided. The computer program product includes computer instructions, and the computer instructions are stored in a computer-readable storage medium. A processor of a controller device reads the computer instructions from the computer-readable storage medium, and the processor executes the computer instructions, so that the controller device performs the method performed by the controller device in the foregoing method embodiments.

In some embodiments, a computer program product is provided. The computer program product includes computer instructions, and the computer instructions are stored in a computer-readable storage medium. A processor of a network device reads the computer instructions from the computer-readable storage medium, and the processor executes the computer instructions, so that the network device performs the method performed by the second network device in the foregoing method embodiments.

In some embodiments, a chip is provided. When the chip is run on a network device, the network device performs the method performed by the first network device in the foregoing method embodiments.

In some embodiments, a chip is provided. When the chip is run on a controller device, the controller device performs the method performed by the controller device in the foregoing method embodiments.

In some embodiments, a chip is provided. When the chip is run on a network device, the network device performs the method performed by the second network device in the foregoing method embodiments.

A person of ordinary skill in the art may be aware that, in combination with the examples described in the embodiments disclosed in this specification, method steps and units can be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be omitted or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments in this application.

In addition, function units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for indicating a computer device (which may be a personal computer, a server, or a network device) to perform all or some of the steps of the methods described in embodiments of this application. The foregoing storage medium includes: any medium that can store program code, such as a USB flash drive, a removable hard disk, a ROM, a RAM, a magnetic disk, or an optical disc.

In embodiments of this application, terms such as "first" and "second" are used to distinguish same items or similar items that have basically same functions. It should be understood that there is no logical or time sequence dependency between "first" and "second", and a quantity and an execution sequence are not limited. It should also be understood that although the terms such as "first" and "second" are used in the following descriptions to describe various elements, these elements should not be limited by the terms. These terms are merely used to distinguish one element from another element. For example, without departing from the scope of various examples, a first network device may be referred to as a second network device. Similarly, a second network device may be referred to as a first network device.

Both the first network device and the second network device may be network devices, and in some cases, may be separate and different network devices.

In this application, "at least one" means one or more and "a plurality of" means two or more.

The term "if" may be interpreted as meaning "when" ("when" or "upon"), "in response to determining", or "in response to detecting". Similarly, according to the context, the phrase "if it is determined that" or "if (a stated condition or event) is detected" may be interpreted as a meaning of "when it is determined that", "in response to determining", "when (a stated condition or event) is detected", or "in response to detecting (a stated condition or event)".

The foregoing descriptions are merely implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer program instructions. When the computer program instructions are loaded and executed on a computer, all or some of the procedures or functions according to embodiments of this application are generated. The computer may be a general-purpose computer, a dedicated computer, a computer network, or other programmable apparatuses.

The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer-readable storage medium may be any usable medium accessible by the computer, or a data storage device, such as a server or a data center that integrates one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

A person of ordinary skill in the art may understand that all or some of the steps of embodiments may be implemented by hardware or a program instructing related hardware. The program may be stored in a computer-readable storage medium. The storage medium may include: a read-only memory, a magnetic disk, or an optical disc.

The foregoing embodiments are merely intended for describing the technical solutions of this application instead of limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A controller device, comprising:
   a memory configured to store computer-executable instructions; and
   one or more processors coupled to the memory and configured to execute the computer-executable instructions to cause the controller device to:
      receive intra-domain topology information comprising a node identifier, wherein the intra-domain topology information indicates a topology in a first domain, and wherein the node identifier identifies a network device that belongs to the first domain;
      receive inter-domain topology information comprising the node identifier, wherein the inter-domain topology information indicates a topology between the first domain and a second domain;
      establish an association relationship between the intra-domain topology information and the inter-domain topology information by splicing, based on the node identifier, the intra-domain topology information and the inter-domain topology information to obtain spliced network topology information; and
      compute, based on the spliced network topology information, an end-to-end forwarding path.

2. The controller device of claim 1, wherein the node identifier identifies a first network device, and wherein the computer-executable instructions that when executed by the one or more processors further cause the controller device to receive the intra-domain topology information and the inter-domain topology information from the first network device.

3. The controller device of claim 1, wherein the computer-executable instructions that when executed by the one or more processors further cause the controller device to receive a first Border Gateway Protocol (BGP) link-state (BGP-LS) packet from a first network device, and wherein the first BGP-LS packet comprises at least one of the intra-domain topology information or the inter-domain topology information.

4. The controller device of claim 3, wherein the first BGP-LS packet comprises a BGP-LS node route comprising the node identifier, wherein the first BGP-LS packet comprises a BGP-LS route of a target route type, wherein the BGP-LS route comprises global device information, wherein the global device information comprises the node identifier, wherein the first BGP-LS packet comprises a BGP-LS link route comprising the node identifier or the first BGP-LS packet comprises a Segment Routing over Internet Protocol version 6 (SRv6) segment identifier (SRv6 SID) route, and wherein the SRv6 SID route comprises the node identifier.

5. The controller device of claim 3, wherein a route attribute field in the first BGP-LS packet comprises a node identifier type-length-value (TLV), wherein a value of the node identifier TLV comprises the node identifier, and wherein a type of the node identifier TLV identifies that the node identifier TLV carries the node identifier.

6. The controller device of claim 5, wherein the route attribute field is a node attribute field or a link attribute field.

7. The controller device of claim 1, wherein the node identifier identifies a first network device or the node identifier identifies a second network device that belongs to the first domain.

8. The controller device of claim 1, wherein the node identifier comprises at least one of a Border Gateway Protocol (BGP) node identifier, an Interior Gateway Protocol (IGP) node identifier, a traffic engineering (TE) node identifier, a system-ID, an Internet Protocol version 4 (IPv4) local node identifier, or an Internet Protocol version 6 (IPv6) local node identifier.

9. The controller device of claim 1, wherein the node identifier identifies a first network device, wherein the computer-executable instructions that when executed by the one or more processors further cause the controller device to receive the intra-domain topology information and the inter-domain topology information from a second network device, and wherein both the second network device and the first network device belong to the first domain.

10. The controller device of claim 1, wherein the node identifier identifies a first network device, wherein the computer-executable instructions that when executed by the one or more processors further cause the controller device to receive the intra-domain topology information from the first network device and receive the inter-domain topology information from a second network device, and wherein both the second network device and the first network device belong to the first domain.

11. The controller device of claim 1, wherein the node identifier identifies a first network device, wherein the computer-executable instructions that when executed by the one or more processors further cause the controller device to receive the inter-domain topology information from the first network device and receive the intra-domain topology information from a second network device, and wherein both the second network device and the first network device belong to the first domain.

12. The controller device of claim 1, wherein the intra-domain topology information comprises interior gateway protocol (IGP) intra-domain topology information, and wherein the inter-domain topology information comprises border gateway protocol (BGP) inter-domain topology information.

13. A method, comprising:
receiving intra-domain topology information comprising a node identifier, wherein the intra-domain topology information indicates a topology in a first domain, and wherein the node identifier identifies a network device that belongs to the first domain;
receiving inter-domain topology information comprising the node identifier, wherein the inter-domain topology information indicates a topology between the first domain and a second domain;
establishing an association relationship between the intra-domain topology information and the inter-domain topology information by splicing, based on the node identifier, the intra-domain topology information and the inter-domain topology information to obtain spliced network topology information; and
computing, based on the spliced network topology information, an end-to-end forwarding path.

14. The method of claim 13, wherein the node identifier identifies a first network device, and wherein the method further comprises receiving the intra-domain topology information and the inter-domain topology information from the first network device.

15. The method of claim 13, wherein the node identifier comprises at least one of a Border Gateway Protocol (BGP) node identifier, an Interior Gateway Protocol (IGP) node identifier, a traffic engineering (TE) node identifier, a system-ID, an Internet Protocol version 4 (IPv4) local node identifier, or an Internet Protocol version 6 (IPv6) local node identifier.

16. The method of claim 13, wherein the node identifier identifies a first network device, wherein the method further comprises receiving the intra-domain topology information and the inter-domain topology information from a second network device, and wherein both the second network device and the first network device belong to the first domain.

17. The method of claim 13, wherein the node identifier identifies a first network device, wherein the method further comprises receiving the intra-domain topology information from the first network device and receive the inter-domain topology information from a second network device, and wherein both the second network device and the first network device belong to the first domain.

18. The method of claim 13, wherein the node identifier identifies a first network device, wherein the method further comprises receiving the inter-domain topology information from the first network device and receive the intra-domain topology information from a second network device, and wherein both the second network device and the first network device belong to the first domain.

19. The method of claim 13, wherein the intra-domain topology information comprises interior gateway protocol (IGP) intra-domain topology information, and wherein the inter-domain topology information comprises border gateway protocol (BGP) inter-domain topology information.

20. A computer program product comprising instructions that are stored on a non-transitory computer-readable storage medium and that, when executed by one or more processors, cause an apparatus to:
receive intra-domain topology information comprising a node identifier, wherein the intra-domain topology information indicates a topology in a first domain, and wherein the node identifier identifies a network device that belongs to the first domain;
receive inter-domain topology information comprising the node identifier, wherein the inter-domain topology information indicates a topology between the first domain and a second domain;
establish an association relationship between the intra-domain topology information and the inter-domain topology information by splicing, based on the node identifier, the intra-domain topology information and the inter-domain topology information to obtain spliced network topology information; and
compute, based on the spliced network topology information, an end-to-end forwarding path.

* * * * *